United States Patent [19]

Ueda et al.

[11] Patent Number: 5,776,602
[45] Date of Patent: Jul. 7, 1998

[54] MAGNETIC RECORDING MEDIUM HAVING A CARBON PROTECTIVE FILM CONTAINING NITROGEN AND OXYGEN AND OVERCOATED WITH A LUBRICANT

[75] Inventors: Hideyuki Ueda, Takatsuki; Kenji Kuwahara, Ikoma; Hiroshi Seki, Nara; Sadayuki Okazaki, Hirakata; Masaru Odagiri, Kawanishi; Kiyoshi Takahashi, Ibaraki; Mikio Murai, Hirakata, all of Japan

[73] Assignee: Matsushita Electric Industrial Co., Ltd., Kadoma, Japan

[21] Appl. No.: 546,833

[22] Filed: Oct. 23, 1995

[30] Foreign Application Priority Data

Oct. 25, 1994 [JP] Japan .................. 6-260198

[51] Int. Cl.$^6$ ...................... G11B 05/66
[52] U.S. Cl. .............. 428/332; 428/336; 428/408; 428/694 T; 428/694 TP; 428/694 TC; 428/694 TF; 428/695; 428/900
[58] Field of Search .............. 428/694 T, 694 TP, 428/694 TC, 694 TF, 900, 332, 340, 341, 408, 336, 695

[56] References Cited

U.S. PATENT DOCUMENTS

| | | | |
|---|---|---|---|
| 5,227,211 | 7/1993 | Eltoukhy et al. | 428/65.4 |
| 5,232,570 | 8/1993 | Haines et al. | 204/192.16 |
| 5,331,487 | 7/1994 | Gregory et al. | 360/97.02 |
| 5,364,690 | 11/1994 | Takahashi et al. | 428/212 |
| 5,397,644 | 3/1995 | Yamashita | 428/408 |
| 5,494,742 | 2/1996 | Seki et al. | 428/332 |
| 5,543,203 | 8/1996 | Tani et al. | 428/156 |
| 5,567,512 | 10/1996 | Chen et al. | 428/332 |
| 5,637,393 | 6/1997 | Ueda et al. | 428/332 |

FOREIGN PATENT DOCUMENTS

| | | |
|---|---|---|
| 61-210518 | 9/1986 | Japan . |
| 62-58416 | 3/1987 | Japan . |
| 63-98824 | 4/1988 | Japan . |
| 1138610 | 5/1989 | Japan . |
| 1245417 | 9/1989 | Japan . |
| 1258223 | 10/1989 | Japan . |
| 1263912 | 10/1989 | Japan . |
| 1320622 | 12/1989 | Japan . |
| 2126417 | 5/1990 | Japan . |
| 2126418 | 5/1990 | Japan . |
| 2158909 | 6/1990 | Japan . |
| 644558 | 2/1994 | Japan . |

*Primary Examiner*—Steven A. Resan
*Attorney, Agent, or Firm*—Renner, Otto, Boisselle & Sklar

[57] ABSTRACT

A magnetic recording medium of the present invention includes: a non-magnetic substrate; a ferromagnetic thin metal layer formed on the non-magnetic substrate; and a carbon layer and a lubricant layer in contact with the carbon layer, which is formed above the ferromagnetic thin metal layer so that the lubricant layer is an outermost layer, wherein the carbon layer contains nitrogen atoms, a Raman spectrum of the carbon layer has a peak A in the range of about 1310 to about 1410 cm$^{-1}$ and a peak B in the range of about 1520 to about 1570 cm$^{-1}$, and a ratio of integrated intensities of the peak A to the peak B is in the range of about 1.2 to about 2.0.

20 Claims, 9 Drawing Sheets

MAGNETIC RECORDING MEDIUM HAVING A CARBON PROTECTIVE FILM CONTAINING NITROGEN AND OXYGEN AND OVERCOATED WITH A LUBRICANT

BACKGROUND OF THE INVENTION

1. Field of the Invention

The present invention relates to a magnetic recording medium used for an audio tape, a video tape, a magnetic disk and the like. In particular, the present invention relates to a magnetic recording medium having excellent electromagnetic conversion characteristics and high reliability for practical use.

2. Description of the Related Art

Recently, a magnetic recording equipment is required to have a larger capacity, higher reading and writing speed, higher quality of image and sound, and be compact and lightweight. To satisfy such requirements, it is essential that a magnetic recording medium should record information at high density. Therefore, instead of a conventional powder coating type magnetic recording medium having a magnetic layer which comprises a binder and magnetic powder dispersed in said binder, a ferromagnetic thin metal layer type magnetic recording medium has been positively developed and practically used, since it has a larger residual magnetic flux density (Br) and, coercive force (Hc) and a thinner magnetic layer, and is more suitable for ultra-smoothing of a magnetic layer surface than the powder coating type one.

However, the magnetic layer of the ferromagnetic thin metal layer type recording medium has low hardness and is easily plastically deformable. Therefore, in the case where the magnetic layer is directly in contact with a magnetic head of a VCR, which rotates at a high speed, the magnetic layer is abraded and damaged in an extremely short period of time, causing the metal to adhere to a sliding face of the head. As a result, there arises a problem that durability is deteriorated (for example, a significant decrease in a record/reproduction output by life and the like). Moreover, although the surface of the magnetic layer is protected by an oxide film formed thereon, corrosion resistance in a highly humid environment is insufficient.

Thus, as methods for improving lubricity, abrasion resistance and corrosion resistance of the ferromagnetic thin metal film layer type magnetic recording medium, the following methods have been conventionally proposed: a method using a base film on which minute protrusions are formed; and a method for forming a protection layer or a lubricant layer containing fluorine which has a sliding property and water repellency effects. With respect to the protection layer, in particular, it is necessary to set the thickness of the protection layer at a small value in order to reduce spacing loss between the magnetic layer and the magnetic head. Thus, various configurations, in which a diamond like carbon layer which has high hardness and thus is hardly abraded is formed on the magnetic layer, have been proposed (for example, described in Japanese Laid-Open Patent Publication Nos. 61-210518 and 63-98824 and the like).

With the conventionally executed methods, however, it is extremely difficult to provide a magnetic recording medium having satisfactory running stability and durability. Accordingly, various problems arise in realizing such a magnetic recording medium.

In the case where a hard protection layer (for example, a diamond like carbon layer) alone is formed on the magnetic layer, since the protection layer itself causes brittle fracture and the sliding surface of the head is significantly damaged due to direct contact with the magnetic head of a VCR rotating at high speed, still-frame life is remarkably decreased and stability of a reproduction output during repetitive running cannot be ensured.

In the case where only the lubricant layer containing fluorine is formed on the magnetic layer, although shearing force can be lowered, the surface of the medium has low hardness and thus is easily abraded. As a result, still-frame life is decreased, and the running stability is deteriorated.

In order to solve the above problems, configurations such as follows have been proposed: a configuration in which a protection coating layer consisting of a layer made of diamond like carbon and a layer made of polymer like carbon is formed on a magnetic layer in this order (described in Japanese Laid-Open Patent Publication No. 1-138610); and a configuration in which a protection layer consisting of an amorphous carbon layer having varying hardness (hardness of the magnetic layer side is higher than that of the surface side) is formed on the magnetic layer (described in Japanese Laid-Open Patent Publication No. 1-258223).

Moreover, Japanese Laid-Open Patent Publication Nos. 1-245417 and 2-158909 disclose a configuration in which a diamond like carbon layer and a lubricant layer (a fatty acid layer containing fluorine) are successively formed on a magnetic layer.

In the above configurations, however, the running stability and durability are not remarkably improved yet, causing many problems.

In the case where the carbon layer having varying hardness is formed on the magnetic layer, the surface of the protection layer has insufficient abrasion resistance. Moreover, since the shearing force is larger than that of lubricant molecules, the running stability is poor, resulting in a decrease in still-frame life.

In the case where the hard diamond like carbon layer and the lubricant layer are successively formed on the magnetic layer, since the surface state of the diamond like carbon layer is chemically inactive, adherence with the lubricant is insufficient. Accordingly, sticking of the lubricant components to the sliding face of the head occurs during recording and reproduction, resulting in various problems such as a significant decrease in an output and clogging of the head for a long period of time.

In order to improve the adherence between the protective layer and the lubricant layer, the following configurations have been recently proposed.

(1) A protection layer made of organic polymer compound containing at least carbon atoms and nitrogen atoms, in which the concentration of the nitrogen atoms of the surface layer is set at 40 atomic % or more with respect to the concentration of the carbon atoms, is provided on a ferromagnetic thin metal layer, and then a lubricant layer is formed on the protection layer (Japanese Laid-Open Patent Publication No. 62-58416).

(2) A diamond like hard carbon thin film having a nitrogen ion implanted layer is provided on a ferromagnetic thin metal layer, and then a lubricant layer is formed on the diamond like hard carbon thin film (Japanese Laid-Open Patent Publication No. 1-263912).

(3) A diamond like hard carbon thin layer containing nitrogen in the range of 5 atomic % to 15 atomic % is provided on a ferromagnetic thin metal layer, and then a lubricant layer is formed on the diamond like hard carbon thin layer (Japanese Laid-Open Patent Publication No. 1-320622).

(4) A hard carbon protection layer, a plasma polymerization layer containing nitrogen, a lubricant layer containing fluorine carboxylic acid are successively formed on a ferromagnetic thin metal layer (Japanese Laid-Open Patent Publication No. 2-126417).

(5) A hard carbon protection layer having specific ratio of integrated peak intensities of a Raman spectrum, density and Vickers hardness, a plasma polymerization layer containing nitrogen, and a lubricant layer containing fluorine are successively formed on a ferromagnetic thin metal layer (Japanese Laid-Open Patent Publication No. 6-44558).

(6) A hard carbon layer is formed on a ferromagnetic thin metal layer, the surface of which is exposed to a glow discharge treatment with ammonia gas, and then a lubricant layer containing fluorine carboxylic acid is formed on the hard carbon layer (Japanese Laid-Open Patent Publication No. 2-126418).

However, as the result of examination of the present inventors, it has become apparent that the abovementioned conventional methods have the following problems, and thus, it is difficult to provide a magnetic recording medium having excellent electromagnetic conversion properties and durability.

For example, in the configuration in which a lubricant layer is formed on a protection layer made of organic polymer compound where a concentration of nitrogen atoms of the surface layer is set at 40 atomic % or more with respect to a concentration of the carbon atoms (Japanese Laid-Open Patent Publication No. 62-58416), although the adherence between the protection layer and the lubricant layer is improved, the hardness of the protection layer itself is lowered due to an excessively high concentration of nitrogen atoms. As a result, the durability of still-frame life and the like is deteriorated.

In the configuration in which a lubricant layer is provided on a diamond like hard carbon thin layer having a nitrogen ion implanted layer (Japanese Laid-Open Patent Publication No. 1-263912) and the configuration in which a lubricant layer is provided on a diamond like hard carbon thin layer containing nitrogen in the range of 5 atomic % to 15 atomic % (Japanese Laid-Open Patent Publication No. 1-320622), the carbon layers contain nitrogen atoms having strong chemical affinity with a polar group introduced into lubricant molecules. However, since carbon atoms in the carbon layer are mainly bonded to each other in an Sp$^3$ form and therefore the amount of Sp$^2$ components contained in the layer is extremely small, the adherence with the lubricant layer is not sufficiently improved. Thus, the running durability cannot be remarkably improved.

Furthermore, since a plasma polymerization layer containing nitrogen has low hardness and is easily abraded in the configuration in which the plasma polymerization layer containing nitrogen is formed at an interface between a hard carbon protection layer and a lubricant layer (Japanese Laid-Open Patent Publication Nos. 2-126417 and 6-44558), running stability and durability cannot be remarkably improved. In particular, in the case where the thickness of the plasma polymerization layer containing nitrogen is set at a large value in order to improve the abrasion resistance, the spacing loss between the magnetic layer and the magnetic head is increased, resulting in deterioration of the electromagnetic conversion characteristics.

Furthermore, in the configuration in which the surface of a hard carbon protection layer is exposed to a glow discharge treatment with ammonia gas and a lubricant layer is formed on the hard carbon protection layer (Japanese Laid-Open Patent Publication No. 2-126418), since the surface of the hard carbon protection layer is remarkably damaged by the impact of charged particles generated from ammonia serving as an unpolymerizable gas, resulting in remarkable deterioration of durability and weather resistance.

SUMMARY OF THE INVENTION

The magnetic recording medium of a first aspect of the invention includes: a non-magnetic substrate; a ferromagnetic thin metal layer formed on the non-magnetic substrate; a carbon layer; and a lubricant layer in contact with the carbon layer, which is formed above the ferromagnetic thin metal layer so that the lubricant layer is an outermost layer, wherein the carbon layer contains nitrogen atoms, a Raman spectrum of the carbon layer has a peak A in the range of about 1310 to about 1410 cm$^{-1}$ and a peak B in the range of about 1520 to about 1570 cm$^{-1}$, and a ratio of integrated intensities of the peak A to the peak B is in the range of about 1.2 to about 2.0.

In one embodiment of the present invention, an atomic ratio of nitrogen to carbon in the carbon layer is in the range of about 5 to about 20%.

In another embodiment of the present invention, an atomic ratio of the nitrogen to oxygen in the carbon layer is about 70% or more.

In still another embodiment of the present invention, density of the carbon layer is about 1.5 g/cm$^3$ or more.

In still another embodiment of the present invention, the Vickers hardness of the carbon layer is about 1800 kg/mm$^2$ or more.

In still another embodiment of the present invention, the lubricant layer comprises a fluorine-containing compound having one or more polar groups selected from the groups consisting of: —COOH, —OH, —SH, —NH$_2$, >NH, —CONH$_2$, —CONHR, —CONR$_2$, —COOR, >PR, >PRO, >PRS, —OPO(OH)$_2$, —OPO(OR)$_2$, and —SO$_3$M (where R is a hydrocarbon group having 1 to 22 carbons, and M is one of hydrogen, an alkali metal and an alkali earth metal).

According to a second aspect of the invention, a non-magnetic substrate; a ferromagnetic thin metal layer formed on the non-magnetic substrate; a carbon multilayered structure including a plurality of carbon layers; and a lubricant layer in contact with a uppermost carbon layer of the plurality of carbon layers, which is formed above the ferromagnetic thin metal layer so that the lubricant layer is an outermost layer, wherein at least the uppermost carbon layer of the plurality of carbon layers contain nitrogen atoms and a concentration of nitrogen atoms in a carbon layer other than the uppermost carbon layer is lower than that in the uppermost carbon layer, a Raman spectrum of the uppermost carbon layer has a peak A in the range of about 1310 to about 1410 cm$^{-1}$ and a peak B in the range of about 1520 to about 1570 cm$^{-1}$, and a ratio of integrated intensities of the peak A to the peak B is in the range of about 1.2 to about 2.0.

In one embodiment of the present invention, a concentration of nitrogen atoms of the plurality of carbon layers decreases in a stepwise manner from the uppermost carbon layer close to the lubricant layer to a carbon layer close to the ferromagnetic thin metal layer.

In another embodiment of the present invention, an atomic ratio of nitrogen to carbon in the uppermost carbon layer is in the range of about 5 to about 20%.

In still another embodiment of the present invention, an atomic ratio of the nitrogen to oxygen in the uppermost carbon layer is about 70% or more.

In still another embodiment of the present invention, a thickness of the uppermost carbon layer is in the range of about 1 to about 15 nm, and a ratio of the thickness of the uppermost carbon layer to a total thickness of the plurality of carbon layers other than the uppermost carbon layer is in the range of about 0.05 to about 5.

In still another embodiment of the present invention, a Raman spectrum of a carbon layer other than the uppermost carbon layer has a peak A in the range of about 1310 to about 1410 cm$^{-1}$ and a peak B in the range of about 1520 to about 1570 cm$^{-1}$, and a ratio of integrated intensities of the peak A to the peak B is about 1.2 or lower.

In still another embodiment of the present invention, a Raman spectrum of the plurality of carbon layers other than the uppermost layer has a peak A in the range of about 1310 to about 1410 cm$^{-1}$ and a peak B in the range of about 1520 to about 1570 cm$^{-1}$, and a ratio of integrated intensity of the peak A to the peak B is about 1.2 or lower.

In still another embodiment of the present invention, density of the plurality of carbon layers is about 1.5 g/cm$^3$ or more.

In still another embodiment of the present invention, Vickers hardness of the plurality of carbon layers is about 1800 kg/mm$^2$ or more.

In still another embodiment of the present invention, the lubricant layer comprises a fluorine-containing compound having one or more polar groups selected from the groups consisting of: —COOH, —OH, —SH, —NH$_2$, >NH, —CONH$_2$, —CONHR, —CONRz, —COOR, >PR, >PRO, >PRS, —OPO(OH)$_2$, —OPO(OR)$_2$, and —SO$_2$M (where R is hydrocarbon having 1 to 22 carbons, and M is one of hydrogen, an alkali metal and an alkali earth metal).

The magnetic recording medium according to a third aspect of the present invention includes: a non-magnetic substrate; a ferromagnetic thin metal layer formed on the non-magnetic substrate; a carbon layer; and a lubricant layer in contact with the carbon layer, which is formed above the ferromagnetic thin metal layer so that the lubricant layer is an outermost layer, wherein the carbon layer contains nitrogen atoms and a concentration of the carbon layer decreases in a continuous manner from a side of an interfacial region of the carbon layer with the lubricant layer to a side of the carbon layer close to the ferromagnetic thin metal layer, a Raman spectrum of the interfacial region of the carbon layer has a peak A in the range of about 1310 to about 1410 cm$^{-1}$ and a peak B in the range of about 1520 to about 1570 cm$^{-1}$, and a ratio of integrated intensities of the peak A to the peak B is in the range of about 1.2 to about 2.0.

In one embodiment of the present invention, an atomic ratio of nitrogen to carbon in the interfacial region of the carbon layer is in the range of about 5 to about 20%.

In another embodiment of the present invention, an atomic ratio of the nitrogen to oxygen in the interfacial region of the carbon layer is about 70% or more.

In still another embodiment of the present invention, a Raman spectrum of a region other than the interfacial region of the carbon layer has a peak A in the range of about 1310 to about 1410 cm$^{-1}$ and a peak B in the range of about 1520 to about 1570 cm$^{-1}$, and a ratio of integrated intensity of the peak A to the peak B is about 1.2 or lower.

According to the first aspect of the present invention, the first carbon layer of the multilayered structure formed on a ferromagnetic thin metal film contains an appropriate amount of nitrogen atoms having chemical affinity with a polar group introduced into lubricant molecules. Moreover, although carbon atoms are mainly bonded to each other in an SP$^3$ form, the first carbon layer has such a structure that the amount of SP$^2$ components contained therein is relatively large. Thus, lubricant molecules can be firmly held onto the surface of the tape.

According to the second aspect of the present invention, the first carbon layer (the uppermost layer) of the multilayered structure formed on the ferromagnetic thin metal layer contains an appropriate amount of nitrogen atoms having strong chemical affinity with a polar group introduced into lubricant molecules. Moreover, although carbon atoms are mainly bonded to each other in an SP$^3$ form, the first carbon layer has such a structure that the amount of SP$^2$ components contained therein is relatively large. Thus, lubricant molecules can be strongly held onto the surface of the tape. Furthermore, the multilayered structure has such a structure that the concentration of the nitrogen atoms in the carbon layers decreases in a stepwise manner in a depth direction from the first carbon layer in contact with the lubricant layer. Thus, since each layer included in the multilayered structure except the first carbon layer (the uppermost layer) has a dense structure with high hardness including a large number of SP$^3$ bonds, it is possible to ensure the abrasion resistance of the multilayered structure itself. Therefore, since synergistic effect of the carbon layer and the lubricant layer which are formed on the magnetic layer can be sufficiently demonstrated, a magnetic recording medium excellent in electromagnetic conversion characteristics, running stability, durability and weather resistance can be provided. The multilayered structure may include one or more layers made of a material other than carbon.

According to the third aspect of the present invention, the interfacial region of the carbon layer with the lubricant layer contains an appropriate amount of nitrogen atoms having chemical affinity with a polar group introduced into lubricant molecules. Moreover, although carbon atoms in the interfacial region are mainly bonded to each other in a SP$^3$ form, the interfacial region of the carbon layer has such a structure that the amount of SP$^2$ components contained therein is relatively large. Thus, lubricant molecules can be firmly held onto the surface of the tape. Furthermore, the concentration of nitrogen atoms in the carbon layer gradually decreases in a depth direction away from an interface in contact with the lubricant layer, the thickness of the interfacial region is preferably less than about 3 nm, and the region of the carbon layer, except the vicinity of the interface with the lubricant layer, has a dense structure with high hardness containing a large number of SP$^3$ bonds. Thus, the internal stress of the carbon layer itself can be appropriately alleviated while ensuring the abrasion resistance of the carbon layer itself.

Therefore, owing to the synergistic effect of the carbon layer and the lubricant layer which are formed on the magnetic layer, a magnetic recording medium excellent in electromagnetic conversion characteristics, running stability, durability and weather resistance can be provided.

Thus, the invention described herein makes possible the advantage of providing a ferromagnetic thin metal layer type magnetic recording medium having excellent electromagnetic conversion characteristics and high practical reliability (running stability, durability and weather resistance).

This and other advantages of the present invention will become apparent to those skilled in the art upon reading and understanding the following detailed description with reference to the accompanying figures.

DESCRIPTION OF THE PREFERRED EMODIMENTS

Figure 1:
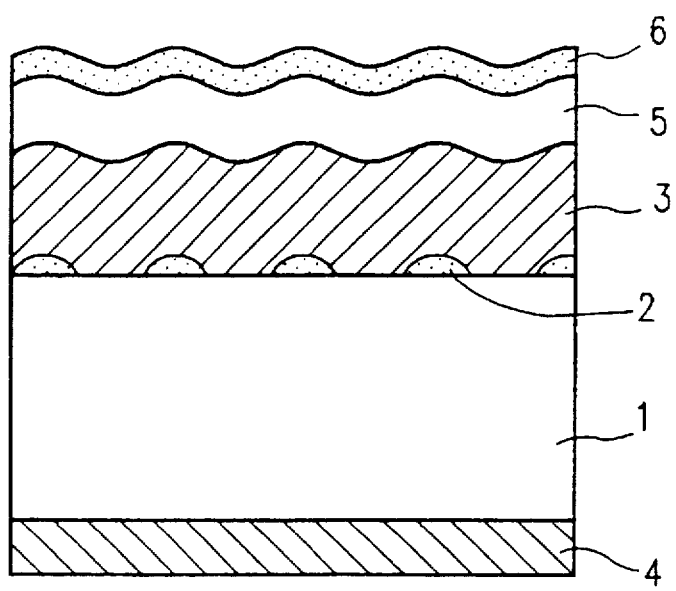
FIG. 1 is an enlarged cross-sectional view showing the configuration of a ferromagnetic thin metal layer type magnetic tape of Example 1 of the present invention.

A magnetic recording medium according to the present invention includes a ferromagntic thin metal layer, a carbon layer and a lubricant layer are formed in this order. Specifically, the lubricant layer, which is on the carbon layer, is in contact with the magnetic head. The carbon layer contains nitrogen atoms, and a ratio of integrated intensity $(I_A/I_B)$ of a peak (peak A) present in the vicinity of 1310 $cm^{-1}$ to 1410 $cm^{-1}$, and a peak (peak B) present in the vicinity of 1520 $cm^{-1}$ to 1570 $cm^{-1}$ in a Raman spectrum is in the range of about 1.2 to 2.0. The carbon layer formed above the ferromagnetic thin metal layer contains an appropriate amount of nitrogen atoms having strong chemical affinity with a polar group introduced into the lubricant molecules, and has such a configuration that the number of $SP^2$ components is relatively large while the carbon atoms are mainly bonded in an $SP^3$ form. The atomic ratio of nitrogen to carbon in the carbon layer is preferably in the range of about 5 to about 20, the atomic ratio of nitrogen to oxygen in the carbon layer is preferably about 70% or more, and the atomic ratio of oxygen to carbon is preferably in the range of about 7 to about 20%. It is sufficient that the carbon layer of the present invention has is the above structure on the side in contact with the lubricant layer.

Moreover, the carbon layer may have a certain concentration distribution in a thickness direction of the layer. Furthermore, the carbon layer may have a plurality of carbon layers each having different concentration distribution of nitrogen atoms. In the case where the carbon layer is made to have a concentration distribution of nitrogen atoms, it is preferred that the concentration of nitrogen an the ferromagnetic metal layer side is lowered. Also in the case where a plurality of carbon layers are formed, it is preferred that the concentration of nitrogen atoms in the carbon layer above the ferromagnetic thin metal layer is low compared to the concentration of nitrogen atoms in the carbon layer closest to the lubricant layer.

A thickness of the carbon layer is suitably set in the range of about 8 nm to about 20 nm in order to ensure a reproduction output in a short-wavelength region of magnetic recording, i.e., to inhibit the so-called spacing loss.

The carbon layer containing nitrogen atoms according to the present invention can be formed by using a plasma CVD method, an ion beam deposition method, an ion beam sputtering method, a laser deposition method and the like.

In the case where the carbon layer containing nitrogen atoms according to the present invention is formed by a plasma CVD method, a mixed gas of an organic gas containing nitrogen and an inorganic gas is used as a material gas. As the organic gas containing nitrogen, an organic monomer gas containing nitrogen atoms as follows can be used: primary, secondary and tertiary alkyl amines, alkenylamines, heterocyclic amines; and specifically, methylamine; ethylamine; propylamine; butylamine; pentylamine; vinylamine; allylamine; dimethylamine; diethylamine; trimethylamine; triethylamines; pyridine; picoline; pyridazine; pyrimidine; pyrazine; acrylamide; acrylnitrile; acetonitrile; aniline; toluidine; phenylenediamine or the like. Regarding the inorganic gas, an inactive gas such as He, Ne, Ar, Kr, Xe or the like can be used.

As a material gas for forming a carbon layer having a concentration gradient of nitrogen atoms, in particular, a hydrocarbon gas is used in addition to the above-mentioned organic gas containing nitrogen and inorganic gas. As the hydrocarbon gas, a saturated hydrocarbon gas such as methane, ethane, propane, butane, pentane, cyclohexane or the like, or an unsaturated hydrocarbon gas such as ethylene, propylene, butadiene, benzene, toluene, xylene, styrene, acetylene or the like can be used.

The discharging mode, in the case where the carbon layer containing nitrogen atoms according to the present invention is formed by a plasma CVD method, is not particularly limited. Specifically, the discharge may be performed in any one of the following modes: DC discharge; low frequency discharge (several Hz to several hundreds of kHZ); high frequency discharge (several hundreds of kHZ to several tens of MHz); and microwave discharge. Furthermore, a mode for applying a DC voltage and an AC voltage in a superimposed manner can be similarly carried out.

The lubricant layer used for the magnetic recording medium according to the present invention is preferably a lubricant containing fluorine, in which at least one polar group selected from the following groups is introduced into the molecules: —COOH; —OH; —SH; —NH$_2$; >NH; —CONH$_2$; —CONHR; —CONR$_2$; —COOR; >PR; >PRO; >PRS; —OPO(OH)$_2$; —OPO(OR)$_2$; and —SO$_3$M (where R is a hydrocarbon group having 1 to 22 carbons, and M is one of hydrogen, an alkali metal and an alkali earth metal). For example, a compound having a chemical formula of C$_3$F$_{11}$(CH$_2$)$_{10}$COOH and other compounds in which —COOH group is substituted by the above-described polar groups can be used. Such a lubricant layer can be formed by a wet coating method or an organic deposition method. It is preferable that the lubricant layer has a thickness in the range of about 2 to about 8 nm.

In the magnetic recording medium according to the present invention, it is preferable that the ferromagnetic thin metal layer is formed on a non-magnetic metal layer. As the non-magnetic metal substrate used in the present invention, a polymer film such as polyethylene torephthalate, polyethylene naphtalate, polyethylene, polypropylene, nitrocellulose, polyvinyl chloride, polyvinylidene chloride, polycarbonate, polyamide or polyimide, a light metal substrate such as an aluminum alloy or a titanium alloy, and a ceramics substrate such as alumina glass can be taken as examples.

Moreover, it is preferable that a minute protrusion layer having protrusions in a particle form or a wrinkle form is formed on the surface of the non-magnetic substrate. It is preferable that the maximum height roughness (Rmax) is in the range of about 10 nm to 50 nm.

The ferromagnetic thin metal layer according to the present invention is formed by a vacuum forming-layer method such as a vacuum deposition method, an ion plating method or a sputtering method. As a ferromagnetic metal material to be used, a metal such as Fe, Co or Ni, and alloys thereof such as Co-Ni, Co-Cr, Co-Ni-Cr, Co-Cr-Ta, Co-Ni-Cr-Ta or Co-Cr-Pt can be taken as examples. It is preferable that the ferromagnetic thin metal layer has a thickness in the range of about 10 nm to 300 nm.

Furthermore, a back coating layer may be formed on the side of the non-magnetic substrate opposite to the side on which the ferromagnetic thin metal layer is formed. The back coating layer is formed by applying and drying a coating material containing carbon black, calcium carbonate, a polyester resin and a nitrocellulose resin as main components. it is preferable that the back coating layer has a thickness of about 500 nm.

EXAMPLE 1

Hereinafter, a first example of the present invention will be described in detail with reference to illustrative drawings.

FIG. 1 is an enlarged cross-sectional view showing the configuration of the forromagnetic thin metal layer type magnetic tape according to a first aspect of the present invention. In FIG. 1, a non-magnetic substrate 1 is made of a polymer film such as polyethylene terephthalate, polyethylene naphtalate, polyamide or polyimide. A minute protrusion layer 2 having the maximum height roughness (Rmax) in the range of about 10 nm to about 30 nm is formed on the surface of the substrate 1 so as to be in contact with a magnetic layer. A ferromagnetic thin metal layer 3 is formed by an oblique vacuum deposition method. According to the oblique vacuum deposition method, a metal source such as Co or an alloy such as Co-Ni is heated and evaporated by a steam flow of a metal or an alloy and the like in a vacuum atmosphere. Then, an incident angle of the steam flow of a metal or an alloy is continuously changed while introducing an extremely small amount of oxygen gas into a vacuum chamber, thereby forming the ferromagnetic thin metal layer 3. The resultant layer 3 has a thickness in the range of about 150 nm to about 200 nm. A back coating layer 4 is formed by applying and drying a coating material containing carbon black, calcium carbonate, a polyester resin and a nitrocellulose resin as main components. The back coating layer 4 has a thickness of about 500 nm. A carbon layer 5 containing nitrogen atoms 5 can be formed by a plasma CVD method or the like. The carbon layer 5 containing nitrogen atoms suitably has a thickness in the range of 8 nm to 20 nm so as to ensure a reproduction output in a short-wavelength region. A lubricant layer 6 containing fluorine contains at least a polar group such as a carboxyl group introduced in molecules. The lubricant layer 6 containing fluorine is formed by a wet coating method or an organic deposition method, and has a thickness of about 3 nm.

Figure 2:
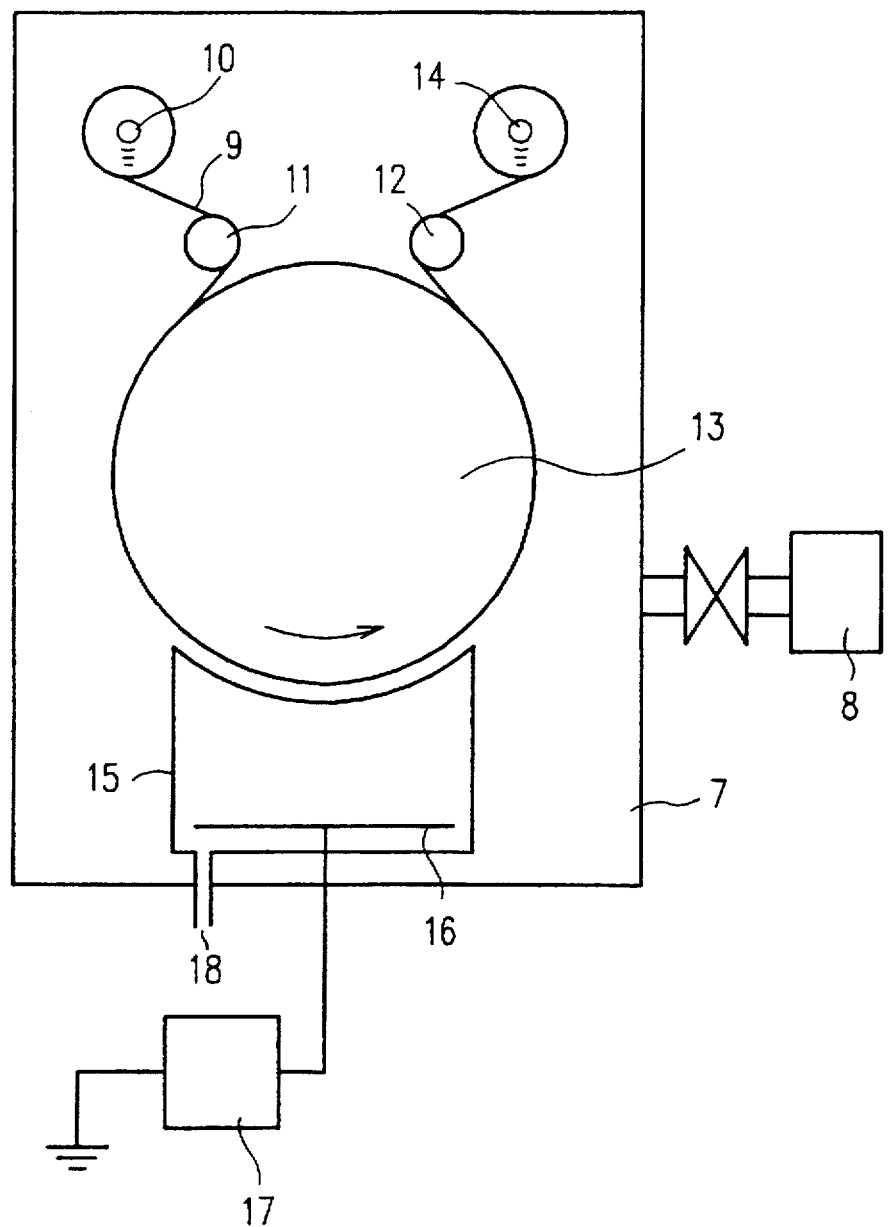
FIG. 2 is a schematic view of a layer-forming apparatus for forming a carbon layer containing nitrogen atoms constituting a ferromagnetic thin metal layer type magnetic tape of the present invention using a plasma CVD method.

FIG. 2 is a schematic view of a layer-forming apparatus for forming the carbon layer 5 containing nitrogen atoms constituting the ferromagnetic thin metal layer type magnetic tape according to the first aspect of the present invention, using a plasma CVD method. In FIG. 2, a vacuum chamber 7 is evacuated by using a vacuum pump 8 so that the vacuum chamber 7 is in a highly vacuum state at the pressure in the range of $10^{-4}$ Torr to $10^{-5}$ Torr. An original tape 9 for a thin metal layer type magnetic tape, which consists of the ferromagnetic thin metal layer 3 and the back coating layer 4 formed on the respective surfaces of the non-magnetic substrate 1, is sent from an unwinding roll 10, passes through the external peripheries of a pass roll 11, a cylindrical cooling can 13 and a pass roll 12, and is wound by a winding roll 14. The cooling can 13 serves to control the rotation so that the original tape 9 for a thin metal layer type magnetic tape can be conveyed at constant speed.

A discharge tube 15 is nonequilibrium plasma generated space is for forming the carbon layer 5 containing nitrogen atoms on the surface of the ferromagnetic thin metal layer 3 of the original tape 9 for a thin metal layer type magnetic tape. Inside the discharge tube 15, a pipe-shaped discharge electrode 16 is provided. The pipe-shaped discharge electrode 16 is connected to a power source 17 for generating plasma. The power source 17 for generating plasma can adopt three types of discharge methods, i.e., a method for applying a DC voltage alone, a method for applying an AC voltage alone, and a method for applying a DC voltage and an AC voltage in a superimposed manner. A material gas inlet 18 is for introducing a mixed gas (material gas) of an organic gas containing nitrogen and an inorganic gas such as argon into the discharge tube 15.

Sample 1-1

On one surface of a polyethylene terephthalate film 1 (produced by Toray Industries, Inc.: E-26) having a thickness of 10 μm which surface has a minute protrusion layer 2 having $10^5$ to $10^9$ minute protrusion per one $mm^2$ with the maximum height roughness Rmax of 15 nm and a diameter of about 200 nm measured by the surface structure analysis with a scanning tunneling microscope (STM), a ferromagnetic metal thin film 3 of Co-O having a thickness of 180 nm is formed by the continuously incident angle changing vapor deposition method. Further, on the other surface of the polyethylene terephthalate film 1, a back coating layer 4 having a thickness of 500 nm after drying is formed by coating a mixture of carbon black, calcium carbonate, a polyester resin and nitrocellulose resin in a mixed solvent of methyl ethyl ketone, toluene and cyclohexanon (solid content of 15% by weight) by the wet coating method.

Next, the original tape 9 for a thin metal layer type magnetic tape is placed within the vacuum chamber 7 of the layer-forming apparatus shown in FIG. 2. After the vacuum chamber 7 is evacuated, allylamine gas (an organic gas containing nitrogen: $C_3H_7N$) and argon gas (inorganic gas: Ar) are introduced into the discharge tube 15. Then, the flow rate of the gases is adjusted so that a pressure ratio of allylamine gas and argon gas is 4:1 and the total pressure of gas is 0.25 Torr. Thereafter, the original tape 9 is conveyed at a rate of 4 m/min around the cooling can 13 while a DC voltage of 1200 V is applied to the pipe-shaped discharge electrode 16 to generate a nonequilibrium plasma to form the carbon layer 5 containing nitrogen atoms having a thickness of 12 nm on the surface of the ferromagnetic thin metal layer 3 of the original tape 9.

Then, on the surface of carbon layer 5 containing nitrogen atoms, a solution of $C_3F_{11}O(CHN_2)_{10}COOH$ in isopropanol at a concentration of 2000 ppm is wet coated and dried to form a lubricant layer 6 having a thickness of 3 nm. Then, the original tape 9 is slit to a width of 8 mm to obtain an 8 m thin metal layer type magnetic tape for VCR.

Sample 1-2

An 8 mm thin metal layer type magnetic tape for VCR is produced by the same method as that of Sample 1-1 except that the carbon layer 5 containing nitrogen atoms is formd to a thickness of 12 mm under the following conditions: a pressure ratio of allylamine gas and argon gas serving as material gases for forming the carbon layer 5 containing nitrogen atoms is 5:1; the total pressure of gas is 0.30 Torr; an applied discharge voltage is a DC voltage 1000 V; and the original tape is conveyed at a rate of 6 m/min.

Sample 1-3

An 8 mm thin metal layer type magnetic tape for VCR is produced by the same method as that of Sample 1-1 except that the carbon layer 5 containing nitrogen atoms is formed to a thickness of 12 nm under the following conditions: butylamine (organic gas containing nitrogen: $C_4H_{11}N$) is used instead of allylamine; a pressure ratio of butylamine gas and argon gas serving as material gases for forming the carbon layer 5 containing nitrogen atoms is 5:1; the total pressure of gas is 0.30 Torr; and an applied discharge voltage is a DC voltage 700 V.

Sample 1-4

An 8 mm thin metal layer type magnetic tape for VCR is produced by the same method as that of Sample 1-1 except that the carbon layer 5 containing nitrogen atoms is formed to a thickness of 12 nm under the following conditions: pyridine (organic gas containing nitrogen: $C_5H_3N$) is used instead of allylamine; a pressure ratio of pyridine gas and the argon gas serving as material gases for forming the carbon layer 5 containing nitrogen atoms is 3:1; the total pressure of gas is 0.20 Torr; an applied discharge voltage is a DC voltage 1500 V; and the original tape is conveyed at a rate of 6 m/min.

Comparative Sample 1-1

An 8 mm thin metal layer type magnetic tape for VCR is produced by the same method as that of Sample 1-1 except that a carbon layer is formed to a thickness of 12 nm under the following conditions: hexane (hydrocarbon gas: $C_4H_{14}$) is used as a material gas for forming the carbon layer 5 containing no nitrogen atom, instead of allylamine; and the original tape is conveyed at a rate of 6 m/min.

Comparative Sample 1-2

An 8 mm thin metal layer type magnetic tape for VCR is produced by the same method as that of Sample 1-1 except that the carbon layer 5 containing nitrogen atoms is formed to a thickness of 12 nm under the following conditions: the total pressure of allylamine gas and argon gas serving as the material gases for forming the carbon layer 5 containing nitrogen is 0.15 Torr; an applied discharge voltage is a DC voltage 1800 V.

Comparative Sample 1-3

An 8 mm thin metal layer type magnetic tape for VCR is produced by the same method as that of Sample 1-1 except that the carbon layer 5 containing nitrogen atoms is formed to a thickness of 12 nm under the following conditions: propylamine (organic gas containing nitrogen: $C_3H_9N$) is used as a material gas for forming the carbon layer 5 containing nitrogen, instead of allylamine; a pressure ratio of propylamine gas and argon gas is 9:1; the total pressure of gas is 0.30 Torr; and an applied discharge voltage is a DC voltage 500 V.

Comparative Sample 1-4

An 8 mm thin metal layer type magnetic tape for VCR is produced by the same method as that of Sample 1-1 except that the carbon layer 5 containing nitrogen atoms, is formed to a thickness of 12 nm under the following conditions: butylamine alone is used as a material gas for forming the carbon layer 5 containing nitrogen, instead of allylamine and argon; pressure of gas is 0.30 Torr; an applied discharge voltage is an AC voltage 700 V (frequency of 30 kHz); and the original tape is conveyed at 2 m/min.

FIGS. 7 through 10 show Raman spectra including peaks A and B in Samples 1-1 and 1-3 and Comparative Samples 1-1 and 1-3, respectively. A ratio of integrated intensities of two Raman peaks regarding the carbon layer 5 containing nitrogen atoms in Samples and Comparative Samples (the carbon layer in the case of Comparative Sample 1-1) corresponds to a value obtained by the following procedure. Two Raman peaks (A) and (B) are obtained by Raman spectroscopy (RS) using a spectrometer JASCO NR-1100 utilizing an argon ion laser (wavelength: 514.5 nm output: 10 mW) as excitation light. The obtained two Raman peaks (A) and (B) are subjected to a waveform separation processing with two Gaussian curves. The integrated intensity of Raman peak (A) after waveform separation ($I_A$) is divided by the integrated intensity of Raman peak (B) after waveform separation ($I_B$), thereby obtaining a value corresponding to the ratio of integrated intensities of two Raman peaks ($I_A I_B$). The results are shown in Table 1.

Each chemical composition (atomic ratio) in the carbon layer 5 containing nitrogen atoms (the carbon layer in the case of Comparative Sample 1-1) in Samples and Comparative Samples is obtained by surface analysis with angle resolved X-ray photoelectron spectroscopy (XPS) using the original tape 9 for a thin metal layer type magnetic tape in which the lubricant layer 6 containing fluorine is not formed yet. The results are shown in Table 1.

The density of the carbon layer 5 containing nitrogen atoms (carbon layer in the case of Comparative Sample 1-1) in Samples and Comparative Samples is calculated from the amount of shift of the peak position of Co atoms constituting the ferromagnetic thin metal layer 3 to a lower energy side before and after the formation of the carbon layer 5 containing nitrogen atoms (the carbon layer in the case of Comparative Sample 1-1) in a Rutherford back scattering (RBS) spectrum obtained by RBS analysis using a helium ion as a probe ion. The results are shown in Table 1.

Furthermore, carbon layers containing nitrogen atoms (a carbon layer in the case of Comparative Sample 1-1) to a thickness in the range of about 1 to about 3 pm are respectively formed on silicon wafers instead of the original tapes 9 for a thin metal layer type magnetic tape under the same conditions as those in Samples and Comparative Samples, thereby fabricating several kinds of samples. The Vickers hardness of each of the sample is measured using a micro hardness meter. The Vickers hardness of the carbon layer 5 containing nitrogen atoms (the carbon layer in the case of Comparative Sample 1-1) corresponding to a thickness of 12 nm is calculated by extrapolation based on its thickness dependence. The resultant value is used as a Vickers hardness value of the carbon layer 5 containing nitrogen atoms (the carbon layer in the case of Comparative Sample 1-1). A thickness of the carbon layer containing nitrogen atoms (the carbon layer in the case of Comparative Sample 1-1) in each of the above sample is a value measured by an ellipsometer. The results are shown in Table 1.

g load. The time at which the video signal decreases by 6 dB from the original video signal is measured. This measurement is conducted for 5 hours at maximum.

(4) Coefficient of friction $\mu_k$ after HTA test:

Each of the magnetic tapes which have been subjected to the HTA test is made to be in contact with a cylindrical stainless (SUS420J2) having a diameter of 4 mm and a

TABLE 1

| | | Characteristics of carbon layer | | | | |
|---|---|---|---|---|---|---|
| | $I_A/I_B$* | $A_N/A_C$** [%] | $A_N/A_O$*** [%] | Density [g/cm$^3$] | Vickers hardness [kg/mm$^2$] | Thickness [nm] |
| Sample 1-1 | 1.32 | 7.6 | 74.8 | 2.05 | 2050 | 12 |
| Sample 1-2 | 1.41 | 8.8 | 79.1 | 1.93 | 1950 | 12 |
| Sample 1-3 | 1.98 | 19.5 | 92.8 | 1.57 | 1800 | 12 |
| Sample 1-4 | 1.21 | 5.2 | 70.9 | 2.11 | 2100 | 12 |
| Comparative sample 1-1 | 0.98 | — | — | 2.28 | 2700 | 12 |
| Comparative sample 1-2 | 1.13 | 4.4 | 68.6 | 2.23 | 2450 | 12 |
| Comparative sample 1-3 | 2.24 | 23.1 | 97.3 | 1.39 | 1650 | 12 |
| Comparative sample 1-4 | 3.28 | 30.9 | 98.7 | 1.25 | 1000 | 12 |

*$I_A$:Integrated intensity for peak A
$I_B$:Integrated intensity for peak B
**$A_N/A_C$:Atomic ratio of N atom to C atom
***$A_N/A_O$:Atomic ratio of N atom to O atom Each of 8 mm thin metal layer type magnetic tapes for VCR (hereinafter, referred simply as magnetic tapes) obtained in the above Samples and Comparative Samples is subjected to the following measuremnts.

(1) Still-frame life:

A video signal is recorded onto each magnetic tape under the environment of 23° C.—10% RH using an 8 mm VCR which is modified to measure still-frame life. The video signal is reproduced in a still mode under the condition of 30 g load. The time at which the video signal decreases by 6 dB from the original video signal is measured. This measurement is conducted for 10 hours at maximum.

(2) Humidity-temperature acceleration test:

As the humidity-temperature acceleration (hereinafter, referred to as HTA) test, the magnetic tape is left for 30 days under the environment of 40° C.—90% RH. The generation of rust, peel-off and the like is observed by an optical micrometer. Then, the results are evaluated in five grades. The magnetic tape which has no significant problem is marked with 5, and the one which has the most significant problems is marked with 1.

(3) Still-frame life after HTA test:

A video signal is recorded onto each magnetic tape after an HTA test under the above-mentioned conditions under the environment of 23° C.—10% RH using an 8 mm VCR which is modified to measure still-frame life. The video signal is reproduced in a still mode under the condition of 30 surface roughness of 0.2 S over 90°. Tension×g of an outgoing side is measured while tension of an entering side is set at 30 g and a tape running rate is set at 0.5 mm/sec with respect to the cylindrical stainless. A coefficient of friction is obtained from the following equation.

$$\mu_k = \frac{2}{\pi} \cdot \ln\frac{X}{30}$$ [Equation 1]

The measurement environment is 25° C.—30% RH, and a measured value at 100th pass is used as a coefficient of friction.

(5) Running durability test:

A video signal is recorded onto each magnetic tape for 60 minutes under the environment of 23° C.—10% RH using an 8 mm VCR which is modified to measure an RF output. The durability test is conducted by repetitive running. The evaluation is represented by the number of passes until a reproduction output is decreased by 3 dB, regarding an output of a first pass of reproduction as a reference (0 dB). The maximum number of passes is 300.

Table 2 shows the result of evaluation of 8 mm thin metal layer type magnetic tapes for VCR produced in Samples and Comparative Samples.

TABLE 2

| | Characteristics of magnetic tape | | | | |
|---|---|---|---|---|---|
| | Still life [min] | HTA test† | Still-frame life after HTA test† [min] | Coefficient of friction μk after HTA test† | Running durability test [pass number] |
| Sample 1-1 | >600 | 5 | 240 | 0.20 | 300 |
| Sample 1-2 | >600 | 5 | 230 | 0.20 | 300 |
| Sample 1-3 | 310 | 5 | 120 | 0.24 | 280 |
| Sample 1-4 | 360 | 5 | 150 | 0.23 | 250 |
| Comparative sample 1-1 | 40 | 2 | 5 | 0.30 | 30 |

TABLE 2-continued

|  | Characteristics of magnetic tape | | | | |
| --- | --- | --- | --- | --- | --- |
|  | Still life [min] | HTA test† | Still-frame life after HTA test† [min] | Coefficient of friction μk after HTA test† | Running durability test [pass number] |
| Comparative sample 1-2 | 210 | 4 | 75 | 0.25 | 170 |
| Comparative sample 1-3 | 100 | 4 | 40 | 0.28 | 200 |
| Comparative sample 1-4 | 30 | 2 | 2 | 0.32 | 50 |

†HTA test:Humidity-temperature acceleration test

As is apparent from Tables 1 and 2, the thin metal layer type magnetic tape of Example 1 includes the carbon layer formed on a ferromagnetic thin metal layer, which contains an appropriate amount ($5\% < A_N A_C < 20\%$) of nitrogen atoms having strong chemical affinity with a polar group (carboxyl group) introduced in lubricant molecules. Furthermore, the carbon layer has such a configuration that the amount of $SP^2$ components is relatively large ($1.2 \pm I_A/I_B \pm 2.0$) while the carbon atoms are mainly bonded to each other in an $SP^3$ form. In the Samples 1-1 to 1-4, the atomic ratio of nitrogen to carbon in the carbon layer is in the range of 5 to 20%, the atomic ratio of nitrogen to oxygen in the carbon layer is 70% or more, and the atomic ratio of oxygen to carbon is in the range of 7 to 20%. Therefore, it is possible to firmly hold the lubricant molecules onto the surface of tape without lowering the hardness of the carbon layer. Thus, it becomes possible to remarkably improve the durability, the weather resistance and the running stability owing to synergistic effect of the carbon layer and the lubricant layer which are formed on the magnetic layer.

In Comparative Sample 1-1, the carbon layer does not contain nitrogen atoms. In addition, the carbon layer has such a configuration that carbon atoms are mainly bonded to each other in an $SP^3$ form and an extremely small amount of $SP^2$ components is contained. Furthermore, in Comparative Sample 1-2, an atomic ratio of nitrogen to carbon ($A_N A_C$) and an atomic ratio of nitrogen to oxygen ($_N/A_O$) in the carbon layer are below the appropriate range of the present invention. In addition, the carbon layer has such a configuration that a relatively small amount of $SP^2$ components is contained therein. Thus, the adherence between the carbon layer and the lubricant layer containing fluorine is not improved, resulting in deterioration of durability, weather resistance and the like.

Although the carbon layer and the lubricant layer are firmly adhered to each other owing to chemical affinity between nitrogen atoms in the carbon layer and the polar group (carboxyl group) introduced into the lubricant molecules in Comparative Samples 1-3 and 1-4, the atomic ratio of nitrogen to carbon ($A_N A_C$) in the carbon layer is above the appropriate range of the present invention. Therefore, the abrasive resistance of the carbon layer itself is lowered, resulting in deterioration of durability and weather resistance.

EXAMPLE 2

Hereinafter, a second example of the present invention will be described in detail with reference to the drawings.

Figure 3:
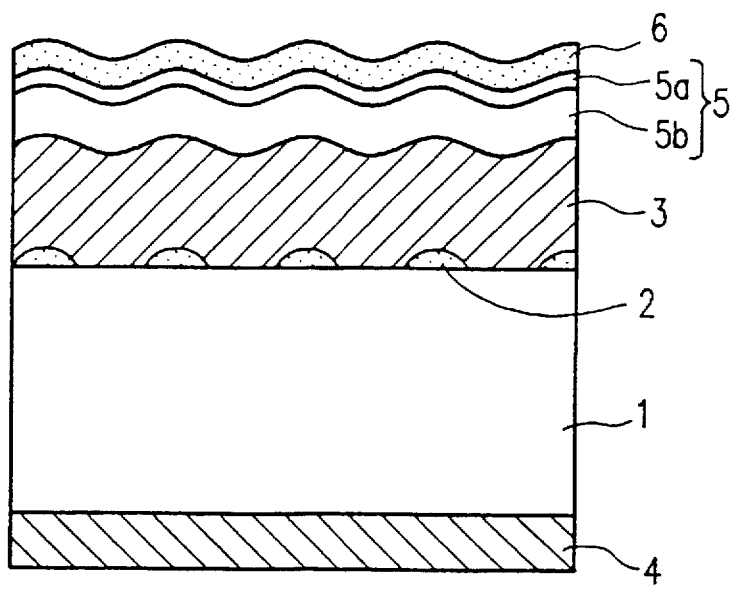
FIG. 3 is an enlarged cross-sectional view showing the configuration of a ferromagnetic thin metal layer type magnetic tape according to Example 2 of the present invention.

FIG. 3 is an enlarged cross-sectional view showing the configuration of the ferromagnetic thin metal layer type magnetic tape according to the second aspect of the present invention. In FIG. 3, the non-magnetic substrate 1 is made of a polymer film such as polyethylene terephthalate, polyethylene naphtalate, polyamide or polyimide. The minute protrusion layer 2 having the maximum height roughness (Rmax) in the range of about 10 nm to about 30 nm is formed on the surface of the substrate 1 so as to be in contact with the magnetic layer. A ferromagnetic thin metal layer 3 is formed by an oblique vacuum deposition method. According to the oblique vacuum deposition method, a metal source such as Co or an alloy such as Co-Ni is heated and evaporated by an electron beam and the like in a vacuum atmosphere. Then, an incident angle of the steam flow of a metal or an alloy is continuously changed while introducing an extremely small amount of oxygen gas into a vacuum chamber, thereby forming the ferromagnetic thin metal layer 3. The resultant layer 3 has a thickness in the range of about 150 nm to about 200 nm. A back coating layer 4 is formed by applying and drying a coating material containing carbon black, calcium carbonate, a polyester resin and a nitrocellulose resin as main components. The back coating layer 4 has a thickness of about 500 nm. A carbon layer 5 containing nitrogen atoms has a layered structure consisting of at least two layers having a nitrogen atom concentration decreasing in a stepwise manner away from the uppermost surface in a depth direction. The total thickness of the carbon layer 5 containing nitrogen atoms is most suitably in the range of 4 nm to 20 nm so as to ensure a reproduction output in a short-wavelength region. The carbon layer 5 containing nitrogen atoms can be formed by a plasma CVD method or the like. The lubricant layer 6 containing fluorine contains at least one polar group such as a carboxyl group introduced into molecules. The lubricant layer 6 containing fluorine is formed by a wet coating method or an organic deposition method, and has a thickness of about 3 nm.

Figure 5:
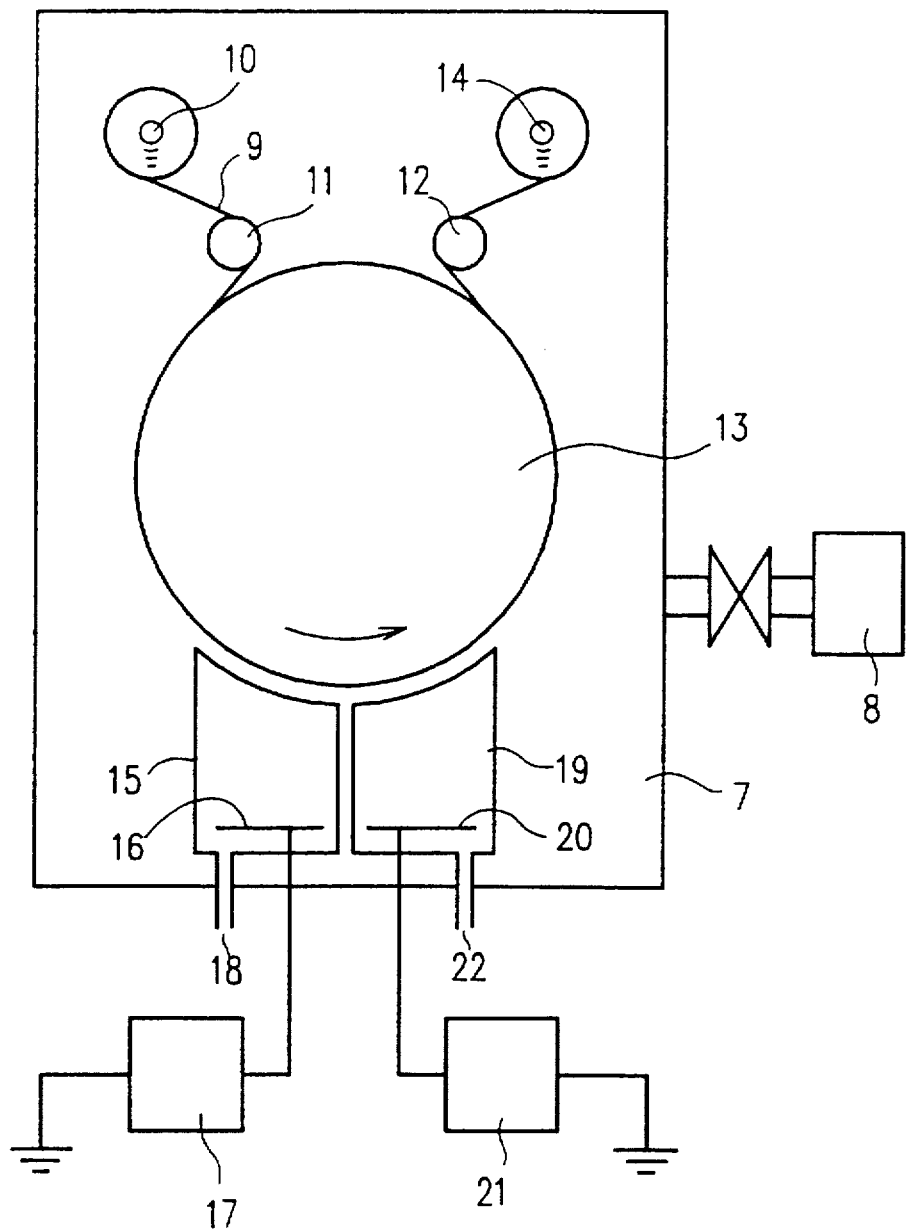
FIG. 5 is a schematic view of a layer-forming apparatus for forming a carbon layer containing nitrogen atoms constituting a ferromagnetic thin metal layer type magnetic tape of the present invention using a plasma CVD method so that a concentration of nitrogen atoms decreases in a stepwise manner in a depth direction away from the uppermost surface.

FIG. 5 is a schematic view of a layer-forming apparatus for forming the carbon layer 5 containing nitrogen atoms (two-layered structure of upper layer 5a/lower layer 5b) constituting the ferromagnetic thin metal layer type magnetic tape according to the second aspect of the present invention, using a plasma CVD method. In FIG. 5, the vacuum chamber 7 is evacuated by using the vacuum pump 8 so that the vacuum chamber 7 is in a high vacuum state at the pressure in the range of $10^{-4}$ Torr to $10^{-5}$ Torr. The original tape 9 for a thin metal layer type magnetic tape, which consists of the ferromagnetic thin metal layer 3 and the back coating layer 4 formed on the surfaces of the non-magnetic substrate 1, is sent from an unwinding roll 10, passes through the external peripheries of the pass roll 11, the cylindrical cooling can 13 and the pass roll 12, and is wound by the winding roll 14. The cooling can 13 serves to control the rotation so that the original tape 9 for a thin metal layer type magnetic tape can be conveyed at constant speed.

The discharge tube 15 is nonequilibrium plasma generated space for forming the lower layer 5b of the carbon layer 5 containing nitrogen atoms on the surface of the ferromagnetic thin metal layer 3 of the original tape 9 for the thin metal layer type magnetic tape. Inside the discharge tube 15, the pipe-shaped discharge electrode 16 is provided. The pipe-shaped discharge electrode 16 is connected to the power source 17 for generating plasma. The power source 17 for generating plasma can apply any one of three types of discharge methods, i.e., a method for applying a DC voltage alone, a method for applying an AC voltage alone, and a method for applying a DC voltage and an AC voltage in a superimposed manner. The material gas inlet 18 is for introducing a mixed gas (material gas) of a hydrocarbon gas and an inorganic gas such as argon into the discharge tube 15.

Another discharge tube 19 is nonequilibrium plasma generation space for forming the upper layer 5a of the carbon layer 5 containing nitrogen atoms on the surface of the lower layer 5b. A pipe-shaped discharge electrode 20 is placed inside the discharge tube 19. The pipe-shaped discharge electrode 20 is connected to a power source 21 for generating plasma. The power source 21 for generating plasma can apply any one of three types of discharge methods, i.e., a method for applying a DC voltage alone, a method for applying an AC voltage alone, and a method for applying a DC voltage and an AC voltage in a superimposed manner. A material gas inlet 22 is for introducing a mixed gas (material gas) of an inorganic gas containing nitrogen and an inorganic gas such as argon into the discharge tube 19.

Sample 2-1

On one surface of the polyethylene terephthalate film 1 (produced by Toray Industries, Inc.: E-26) having a thickness of 10 μm which surface has the minute protrusion layer 2 having $10^5$ to $10^9$ minute protrusion per one $mm^2$ with the maximum height roughness Rmax of 15 nm and a diameter of about 200 nm measured by the surface structure analysis with a scanning tunneling microscope (STM), The ferromagnetic metal thin film 3 of Co-O having a thickness of 180 nm is formed by the continuously incident angle changing vapor deposition method. Further, on the other surface of the polyethylene terephthalate film 1, the back coating layer 4 having a thickness of 500 nm after drying is formed by coating a mixture of carbon black, calcium carbonate, a polyester resin and nitrocellulose resin in a mixed solvent of methyl ethyl ketone, toluene and cyclohexanon (solid content of 15% by weight) by the wet coating method.

Next, the original tape 9 for a thin metal layer type magnetic tape is placed within the vacuum chamber 7 of the layer-forming apparatus shown in FIG. 5. After the vacuum chamber 7 is evacuated, benzene gas (hydrocarbon gas: $C_6H_6$) and argon gas (inorganic gas: Ar) are introduced into the discharge tube 15. Then, the flow rate of the gases is adjusted so that a pressure ratio of benzene gas and argon gas is 4:1 and the total pressure of gas is 0.20 Torr. Allylamine gas (organic gas containing nitrogen: $C_3H_7N$) and argon gas are introduced into the discharge tube 19, and the flow rate of the gases is adjusted so that a pressure ratio of allylamine gas and argon gas is 4:1 and the total pressure of gas is 0.25 Torr. Thereafter, the original tape 9 is conveyed at a rate of 16 m/min around the cooling can 13 while a DC voltage of 1300 V is applied to the pipe-shaped discharge electrode 16 to generate a nonequilibrium plasma to form the lower layer 5b of the carbon layer 5 containing nitrogen atoms having a thickness of 9 nm on the surface of the ferromagnetic thin metal layer 3 of the original tape 9. Then, a CD voltage of 1100 V is applied to the pipe-shaped discharge electrode 20 to generate a nonequilibrium plasma to form the upper layer 5a of the carbon layer 5 containing nitrogen atoms having a thickness of 3 mm on the previously formed lower layer 5b.

Then, on the surface of the upper layer 5a of the carbon layer 5 containing nitrogen atoms, a solution of $_5F_{11}(CHN_2)_{10}COOH$ in isopropanol at a concentration of 2000 ppm is wet coated and dried to form a lubricant layer 6 having a thickness of 3 nm. Then, the original tape 9 is slit to a width of 8 mm to obtain an 8 mm thin metal layer type magnetic tape for VCR.

Sample 2-2

An 8 mm thin metal layer type magnetic tape for VCR is produced by the same method as that of Sample 2-1 except that the lower layer 5b and the upper layer 5a of the carbon layer 5 containing nitrogen atoms are formed to thicknesses of 11 nm and 1 nm, respectively, under the following conditions: toluene (hydrocarbon gas: $C_7H_8$) is used as a material gas for forming the lower layer 5b of the carbon layer 5 containing nitrogen atoms instead of benzene; a pressure ratio of toluene gas and argon gas is 4:1; the total pressure of gas is 0.25 Torr; an applied discharge voltage is a DC voltage of 1500 V; butylamine (organic gas containing nitrogen: $C_4H_{11}N$) is used as a material gas for forming the upper layer 5a instead of allylamine; a length of the discharge tube 19 in a longitudinal direction of the original tape (a direction in which the original tape is conveyed) is set to one-third of the standard length; a pressure ratio of butylamine gas and argon gas is 5:1; the total pressure of gas is 0.30 Torr; and an applied discharge voltage is a DC voltage of 650 V.

Sample 2-3

An 8 mm thin metal layer type magnetic tape for VCR is produced by the same method as that of Sample 2-1 except that the lower layer 5b and the upper layer 5a of the carbon layer 5 containing nitrogen atoms are formed to thicknesses of 3 nm and 15 nm, respectively, under the following conditions: methane (hydrocarbon gas: $CH_4$) is used as a material gas for forming the lower layer 5b of the carbon layer 5 containing nitrogen atoms instead of benzene; a length of the discharge tube 15 in a longitudinal direction of the original tape (a direction in which the original tape is conveyed) is set to be three-fifths of the standard length; a pressure ratio of methane gas and argon gas is 3:1; the total pressure of gas is 0.08 Torr; an applied discharge voltage is a DC voltage of 800 V; butylamine is used as a material gas for forming the upper layer instead of allylamine; a pressure ratio of butylamine gas and argon gas is 5:1; the total pressure of gas is 0.30 Torr; an applied discharge voltage is a DC voltage of 650 V; and the original tape is conveyed at a rate of 3 m/min.

Sample 2-4

An 8 mm thin metal layer type magnetic tape for VCR is produced by the same method as that of Sample 2-1 except that the lower layer 5b and the upper layer 5a of the carbon layer 5 containing nitrogen atoms are formed to thicknesses of 6 nm and 6 nm, respectively, under the following conditions: a length of the discharge tube 15 in a longitudinal direction of the original tape (a direction in which the original tape is conveyed) is set to be half of the standard length; a pressure ratio of benzene and argon gas is 4:1; the total pressure of gas is 0.20 Torr; pyridine is used as a material gas for forming the upper layer 5a instead of allylamine; a pressure ratio of pyridine gas and argon gas is 3:1; the total pressure of gas is 0.20 Torr; an applied discharge voltage is a DC voltage of 1400 V; and the original tape is conveyed at a rate of 12 m/min.

Comparative Sample 2-1

An 8 mm thin metal layer type magnetic tape for VCR is produced by the same method as that of Sample 2-1 except that an upper carbon layer is formed to a thickness of 3 nm under the following conditions: methane is used as a material gas for forming the upper carbon layer instead of allylamine; and an applied discharge voltage is a DC voltage 500 V.

Comparative Sample 2-2

An 8 mm thin metal layer type magnetic tape for VCR is produced by the same method as that of Sample 2-1 except that the lower layer 5b and the upper layer 5a of the carbon layer 5 containing nitrogen atoms are formed to thicknesses of 6 nm and 6 nm, respectively, under the following conditions: a length of the discharge tube 15 in a longitudinal direction of the original tape (a direction in which the original tape is conveyed) is set to be two-thirds of the standard length; a pressure ratio of benzene gas and argon gas is 4:1; the total pressure of gas is 0.20 Torr; a length of the discharge tube 19 in a longitudinal direction of the original tape (a direction in which the original tape is conveyed) is set to be double of the standard length; a pressure ratio of allylamine gas and argon gas is 4:1; the total pressure of gas is 0.25 Torr; and an applied discharge voltage is a DC voltage of 1900 V.

Comparative Sample 2-3

An 8 mm thin metal layer type magnetic tape for VCR is produced by the same method as that of Sample 2-1 except that the lower layer 5b and the upper layer 5a of the carbon layer 5 containing nitrogen atoms are formed to thicknesses of 2 nm and 16 nm, respectively, under the following conditions: methane is used as a material gas for forming the lower layer 5b of the carbon layer 5 containing nitrogen atoms instead of benzene; a length of the discharge tube 15 in a longitudinal direction of the original tape (a direction in which the original tape is conveyed) is set to be two-fifths of the standard length; a ratio of methane gas and argon gas is 3:1; the total pressure of gas is 0.08 Torr; an applied discharge voltage is a DC voltage of 800 V; propylamine (organic gas containing nitrogen: $C_3H_9N$) as a material gas for forming the upper layer 5a , instead of allylamine; a pressure ratio of propylamine gas and argon gas is 9:1; the total pressure of gas is 0.30 Torr; an applied discharge voltage is a DC voltage of 450 V; and the original tape is conveyed at a rate of 3 m/min.

Comparative Sample 2-4

An 8 mm thin metal layer type magnetic tape for VCR is produced by the same method as that of Sample 2-1 except that the lower layer 5b and the upper layer 5a of the carbon layer 5 containing nitrogen atoms are formed to thicknesses of 15 nm and 3 nm, respectively, under the following conditions: methane is used as a material gas for forming the lower layer 5b of the carbon layer 5 containing nitrogen atoms instead of benzene; a length of the discharge tube 15 in a longitudinal direction of the original tape (a direction in which the original tape is conveyed) is set to be 2.5 times of the standard length; a pressure ratio of methane gas and argon gas is 4:1; the total pressure of gas is 0.25 Torr; an applied discharge voltage is a DC voltage of 500 V; butylamine alone is used as a material gas for forming the upper layer 5a instead of allylamine and argon; the pressure of gas is 0.30 Torr; an applied discharge voltage is an AC voltage of 700 V (frequency of 30 kHz); and the original tape is conveyed at a rate of 8 m/min.

A ratio of integrated intensities of two Raman peaks regarding the upper and lower layers 5a and 5b of the carbon layer 5 containing nitrogen atoms in Samples and Comparative Samples (the carbon layer in the case of Comparative Sample 2-1) corresponds to a value obtained by the following procedure. Two Raman peaks (A) and (B), which are obtained by Raman spectral analysis (RS) utilizing an argon ion laser (wavelength: 514.5 nm) as excitation light, are subjected to waveform separation processing with two Gaussian curves. The integrated intensity of Raman peak (A) after waveform separation ($I_A$) is divided by the integrated intensities of Raman peak (B) after waveform separation ($I_B$), thereby obtaining a value corresponding to the ratio of integrated intensity of two Raman peaks ($I_A/I_B$). The results are shown in Table 3.

Each chemical composition (atomic ratio) in the upper layer 5a of the carbon layer 5 containing nitrogen atoms (the carbon layer in the case of Comparative Sample 2-1) in Samples and Comparative Samples is obtained by surface analysis with angle resolved XPS using the original tape 9 for a thin metal layer type magnetic tape in which the lubricant layer 6 containing fluorine is not formed yet. The results are shown in Table 3.

The density of the carbon layer 5 containing nitrogen atoms (carbon layer in the case of Comparative Sample 2-1) in Samples and Comparative Samples is calculated from the amount of shift of the peak position of Co atoms constituting the ferromagnetic thin metal layer 3 to a lower energy side before and after the formation of the carbon layer 5 containing nitrogen atoms (the carbon layer in the case of Comparative Sample 2-1) in a RBS spectrum obtained by RBS analysis using a helium ion as a probe ion. The results are shown in Table 3.

Furthermore, carbon layers containing nitrogen atoms (a carbon layer in the case of Comparative Sample 2-1) to a thickness in the range of about 1 to about 3 μm are respectively formed on silicon wafers instead of the original tapes 9 for a thin metal layer type magnetic tape under the same conditions as those in Samples and Comparative Samples, thereby producing several kinds of samples. The Vickers hardness of each of the sample is measured using a micro hardness motor. The Vickers hardness of the carbon layer 5 containing nitrogen atoms (the carbon layer in the case of Comparative Sample 1-1) corresponding to a thickness of 12 nm (18 nm in the case of Sample 2-3, Comparative Samples 2-3 and 2-4) is calculated by extrapolation based on its thickness dependence. The resultant value is used as a Vickers hardness value of the carbon layer 5 containing nitrogen atoms (the carbon layer in the case of Comparative Sample 2-1). A thickness of the carbon layer 5 containing nitrogen atoms (the carbon layer in the case of Comparative Sample 2-1) in each of the above sample is a value measured by an ellipsometer. The results are shown in Table 3.

TABLE 3

| | Characteristics of carbon layer consisting of upper and lower layers | | | | | | | | |
|---|---|---|---|---|---|---|---|---|---|
| | Upper layer | | | Lower layer $I_A/I_B$* | Density of carbon layer [g/cm³] | Vickers hardness carbon layer [kg/mm²] | Thickness of upper layer [nm] | Thickness ratio of upper layer/ lower layer | Thickness [nm] |
| | $I_A/I_B$* | $A_N/A_C$** [%] | $A_N/A_O$*** [%] | | | | | | |
| Sample 2-1 | 1.36 | 8.2 | 77.1 | 1.06 | 2.19 | 2300 | 3 | 0.33 | 12 |
| Sample 2-2 | 1.99 | 19.7 | 93.4 | 0.94 | 2.23 | 2400 | 1 | 0.09 | 12 |
| Sample 2-3 | 1.99 | 19.7 | 93.4 | 1.18 | 1.66 | 1850 | 15 | 5.00 | 18 |
| Sample 2-4 | 1.25 | 5.4 | 72.1 | 1.06 | 2.17 | 2200 | 6 | 1.00 | 12 |
| Comparative sample 2-1 | 1.52 | — | — | 1.06 | 2.16 | 2200 | 3 | 0.33 | 12 |
| Comparative sample 2-2 | 1.16 | 4.2 | 66.9 | 1.06 | 2.24 | 2400 | 6 | 1.00 | 12 |
| Comparative sample 2-3 | 2.28 | 23.7 | 98.1 | 1.18 | 1.46 | 1750 | 16 | 8.00 | 18 |
| Comparative sample 2-4 | 3.47 | 33.5 | 99.1 | 1.52 | 1.77 | 1900 | 3 | 0.20 | 18 |

*$I_A$:Integrated intensity for peak A
$I_B$:Integrated intensity for peak B
**$A_N/A_C$:Atomic ratio of N atom to C atom
***$A_N/A_O$:Atomic ratio of N atom to O atom Each of the 8 mm thin metal layer type magnetic tapes for VCR (hereinafter, referred simply as magnetic tapes) obtained in the above Samples and Comparative Samples is subjected to the same measurements as those in Example 1.

Table 4 shows the results of evaluation of each of the 8 mm thin metal layer type magnetic tapes for VCR produced in Samples and Comparative Samples.

TABLE 4

| | Characteristics of magnetic tape | | | | |
|---|---|---|---|---|---|
| | Still life [min] | HTA test† | Still-frame life after HTA test† [min] | Coefficient of friction μk after HTA test† | Running durability test [pass number] |
| Sample 2-1 | >600 | 5 | >300 | 0.18 | 300 |
| Sample 2-2 | 540 | 5 | 220 | 0.18 | 300 |
| Sample 2-3 | 300 | 5 | 110 | 0.25 | 270 |
| Sample 2-4 | 420 | 5 | 210 | 0.21 | 260 |
| Comparative sample 2-1 | 50 | 3 | 15 | 0.28 | 100 |
| Comparative sample 2-2 | 220 | 4 | 80 | 0.24 | 160 |
| Comparative sample 2-3 | 90 | 4 | 30 | 0.29 | 190 |
| Comparative sample 2-4 | 80 | 3 | 25 | 0.30 | 140 |

†HTA test: Humidity-temperature acceleration test

As is apparent from Tables 3 and 4, the thin metal layer type magnetic tape of Example 2 includes the carbon layer formed on a ferromagnetic thin metal layer, the upper layer of which contains an appropriate amount of nitrogen atoms having strong chemical affinity with a polar group (carboxyl group) introduced into lubricant molecules of the lubricant layer. Furthermore, the upper layer of the carbon layer has such a configuration that the amount of SP² components is relatively large while the carbon atoms are mainly bonded to each other in an SP³ form. In the Samples 2-1 to 2-4, the atomic ratio of nitrogen to carbon in the upper layer is in the range of about 5 to about 20%, the atomic ratio of nitrogen to oxygen in the upper layer is about 70% or more, and the atomic ratio of oxygen to carbon is in the range of about 7 to about 20%. Therefore, it is possible to firmly hold the lubricant molecules onto the surface of tape. Furthermore, since the lower layer of the carbon layer has a highly hard and dense structure including a large number of SP³ bonds ($I_A/I_B$<1.2), it becomes possible to ensure the abrasive resistance of the carbon layer itself. Thus, it becomes possible to remarkably improve the durability, the weather resistance and the running stability owing to sufficient synergistic effect of the carbon layer and the lubricant layer which are formed on the magnetic layer.

In Comparative Sample 2-1, the upper layer of the carbon layer does not contain nitrogen atoms. Furthermore, in Comparative Sample 2-2, an atomic ratio of nitrogen to carbon ($A_N/A_C$) and an atomic ratio of nitrogen to oxygen ($A_N/A_O$) in the carbon layer are below the designated range of the present invention. In addition, the carbon layer has such a configuration that a relatively small amount of SP² components is contained therein. Thus, the adherence between the carbon layer and the lubricant layer containing fluorine is not improved, resulting in deterioration of durability, weather resistance and the like.

Although the carbon layer and the lubricant layer are firmly adhered to each other owing to chemical affinity of nitrogen atoms in the upper layer of the carbon layer and the polar group (carboxyl group) introduced into the lubricant molecules in Comparative Samples 2-3 and 2-4, the atomic ratio of nitrogen to carbon $A_N/A_C$) in the upper layer of the carbon layer is above the appropriate range of the present invention. Moreover, in the case of Comparative Sample 2-3, the thickness of the upper layer of the carbon layer is large and therefore a ratio of thickness of upper layer/lower layer is too large, and the number of SP³ bonds in the lower layer is too small. Therefore, the abrasive resistance of the carbon layer itself is lowered, resulting in deterioration of durability and weather resistance.

Although the carbon layer having a two-layered structure alone is exemplified as a carbon layer having a layered structure in which the concentration of nitrogen atoms decreases in a stepwise manner from the uppermost surface in a depth direction, a carbon layer having multilayered structure having three or more layers is applicable in the same manner.

EXAMPLE 3

Hereinafter, a third example of the present invention will be described in detail with reference to the drawings.

Figure 4:
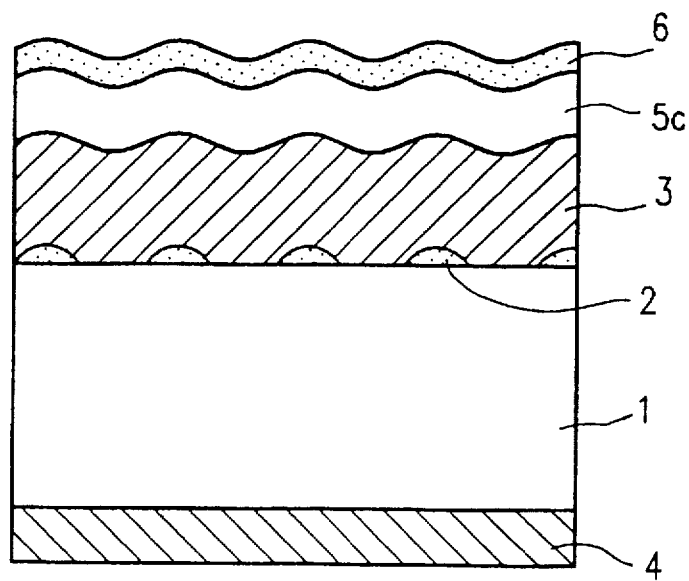
FIG. 4 is an enlarged cross-sectional view showing the configuration of a ferromagnetic thin metal layer type magnetic tape according to Example 3 of the present invention.

As shown in FIG. 4, Example 3 differs from Example 1 in that the concentration of nitrogen atoms of a carbon layer 5c containing nitrogen atoms gradually decreases in a depth direction away from the interface in contact with the lubricant layer 6 containing fluorine.

Figure 6:
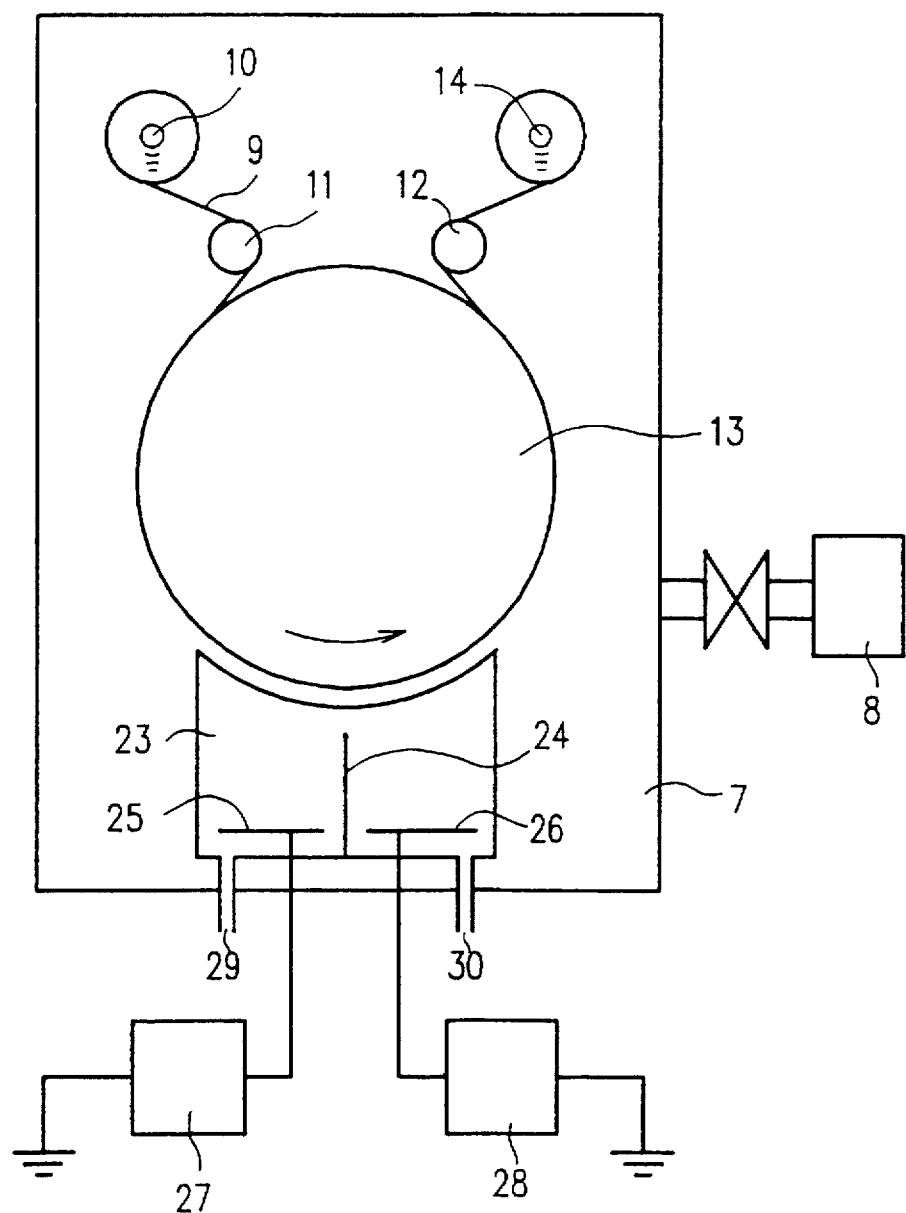
FIG. 6 is a schematic view of a layer-forming apparatus for forming a carbon layer containing nitrogen atoms constituting a ferromagnetic thin metal layer type magnetic tape of the present invention using a plasma CVD method so that the concentration of nit rogen atoms gradually decreases in a depth direction away from the uppermost surface.
Figure 7:
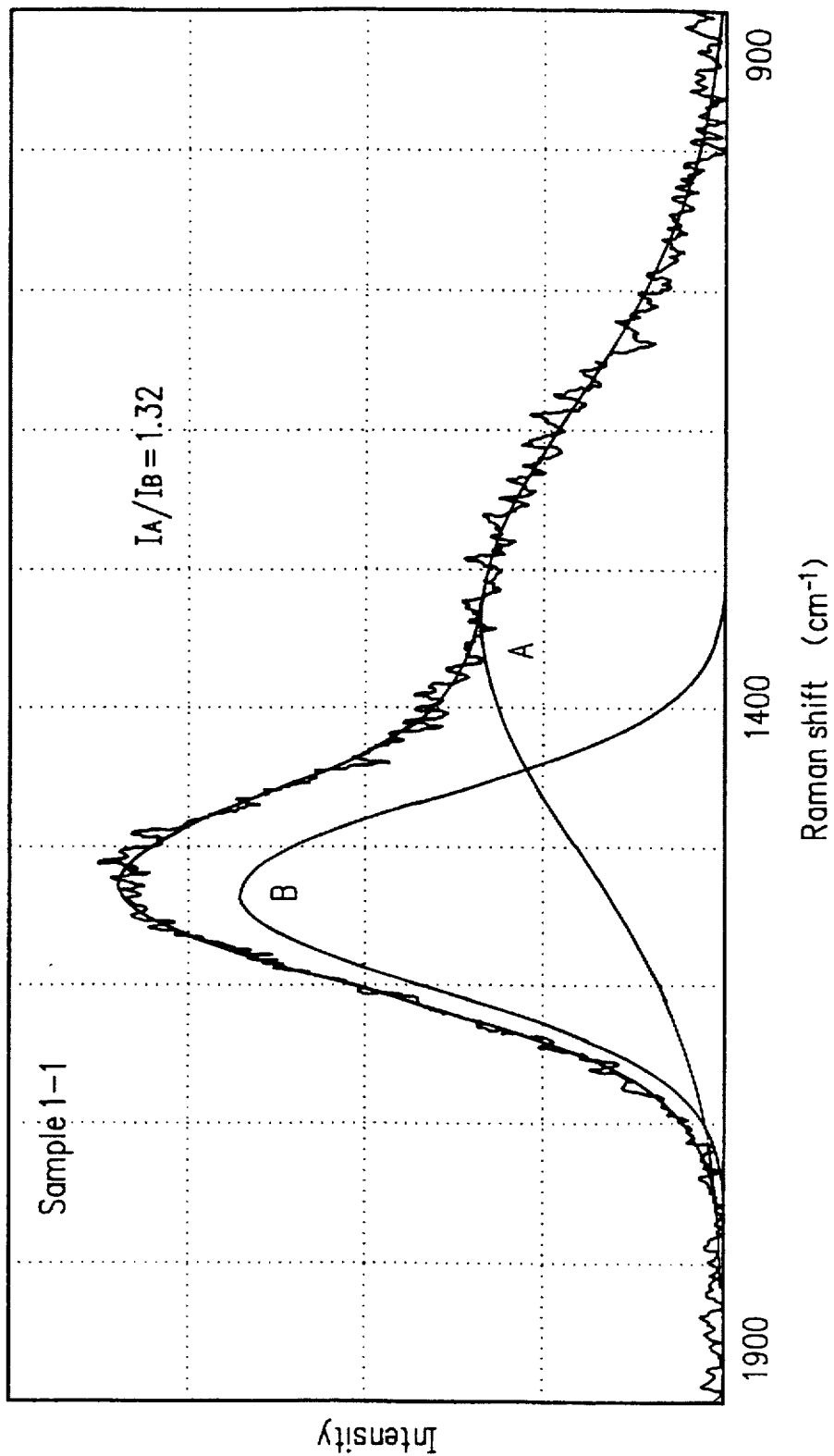
FIG. 7 is a Raman spectrum including Raman peaks A and B of Sample 1-1.
Figure 8:
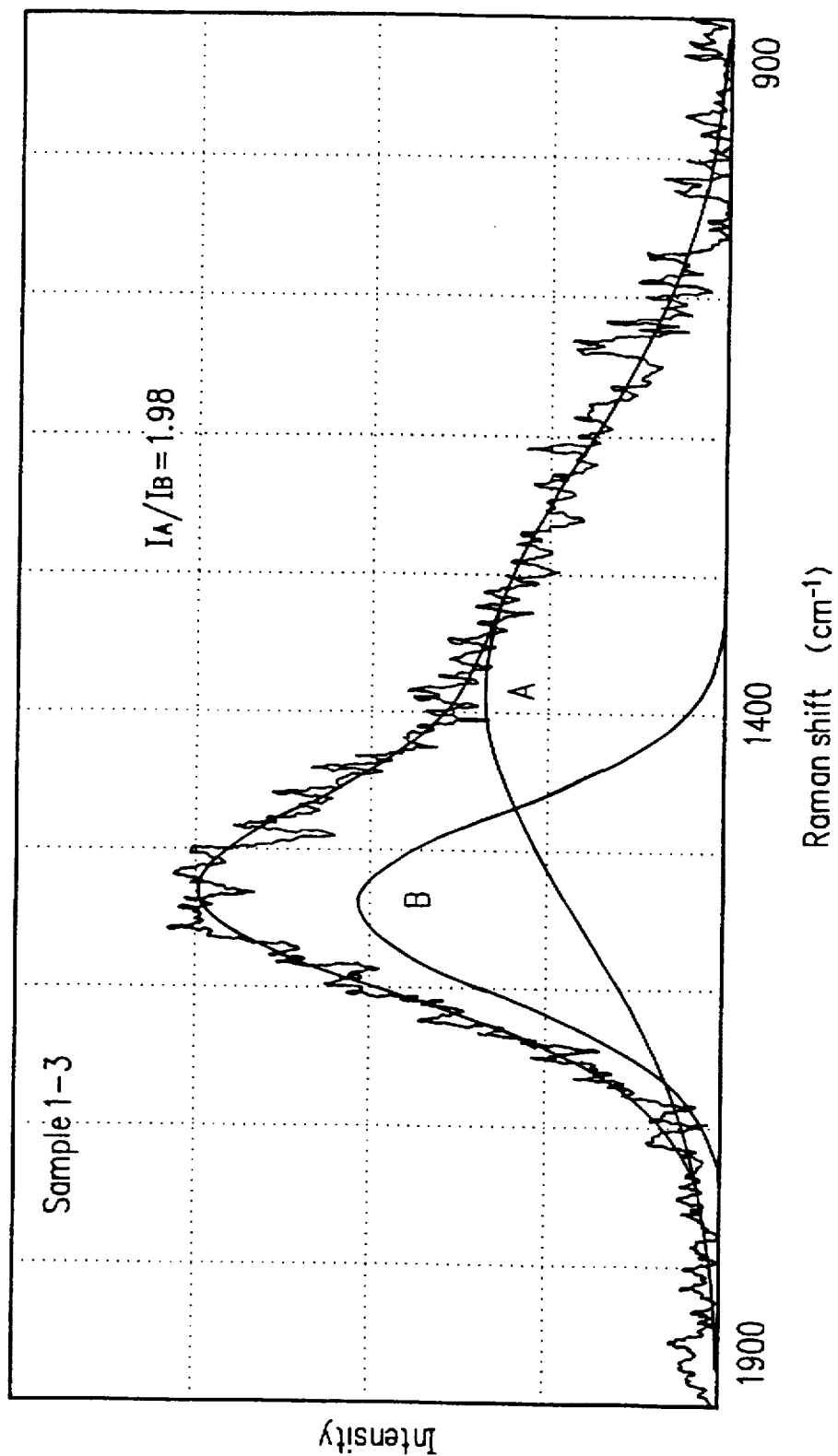
FIG. 8 is a Raman spectrum including Raman peaks A and B of Sample 1-3.
Figure 9:
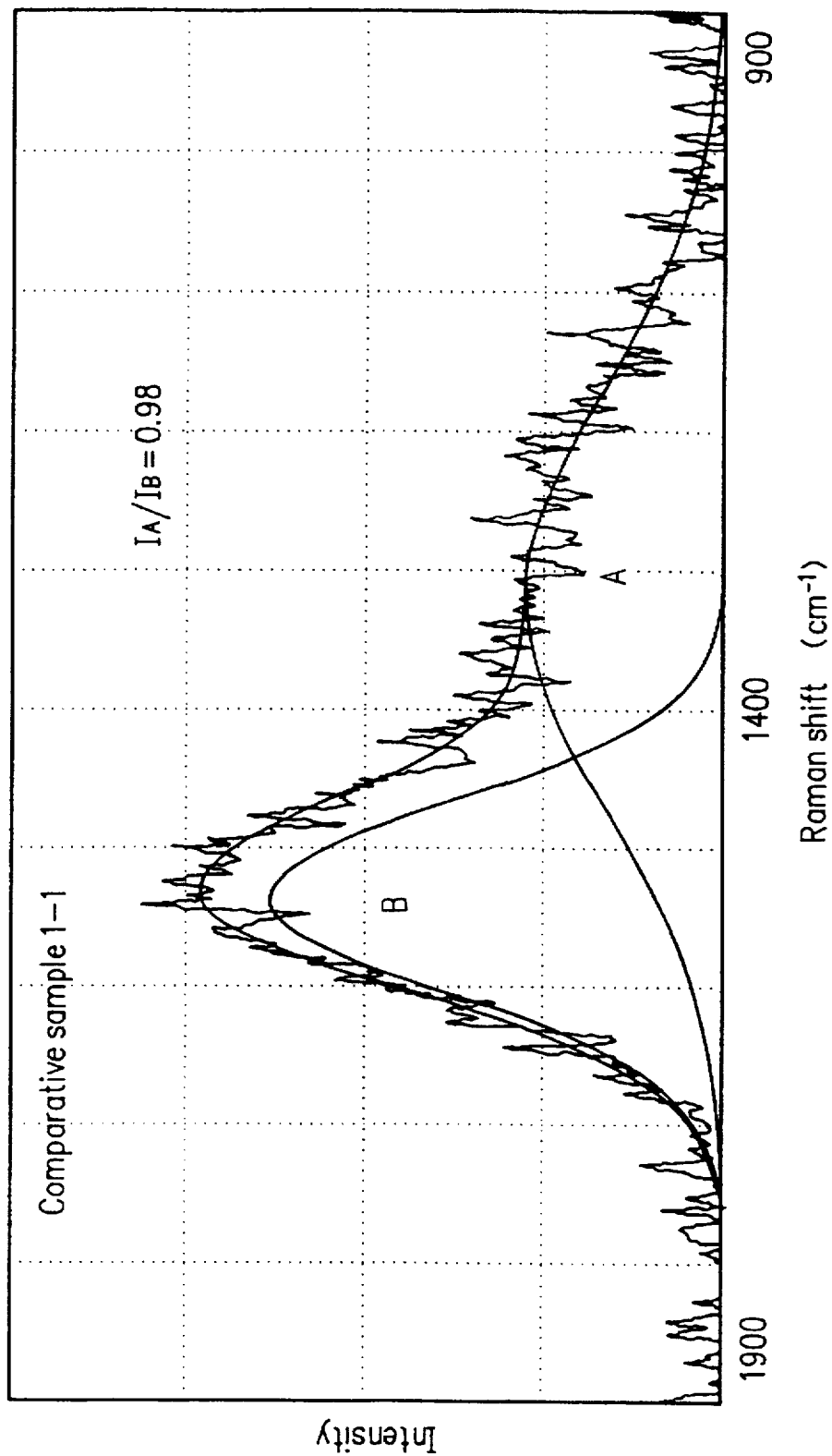
FIG. 9 is a Raman spectrum including Raman peaks A and B of Comparative Sample 1-1.
Figure 10:
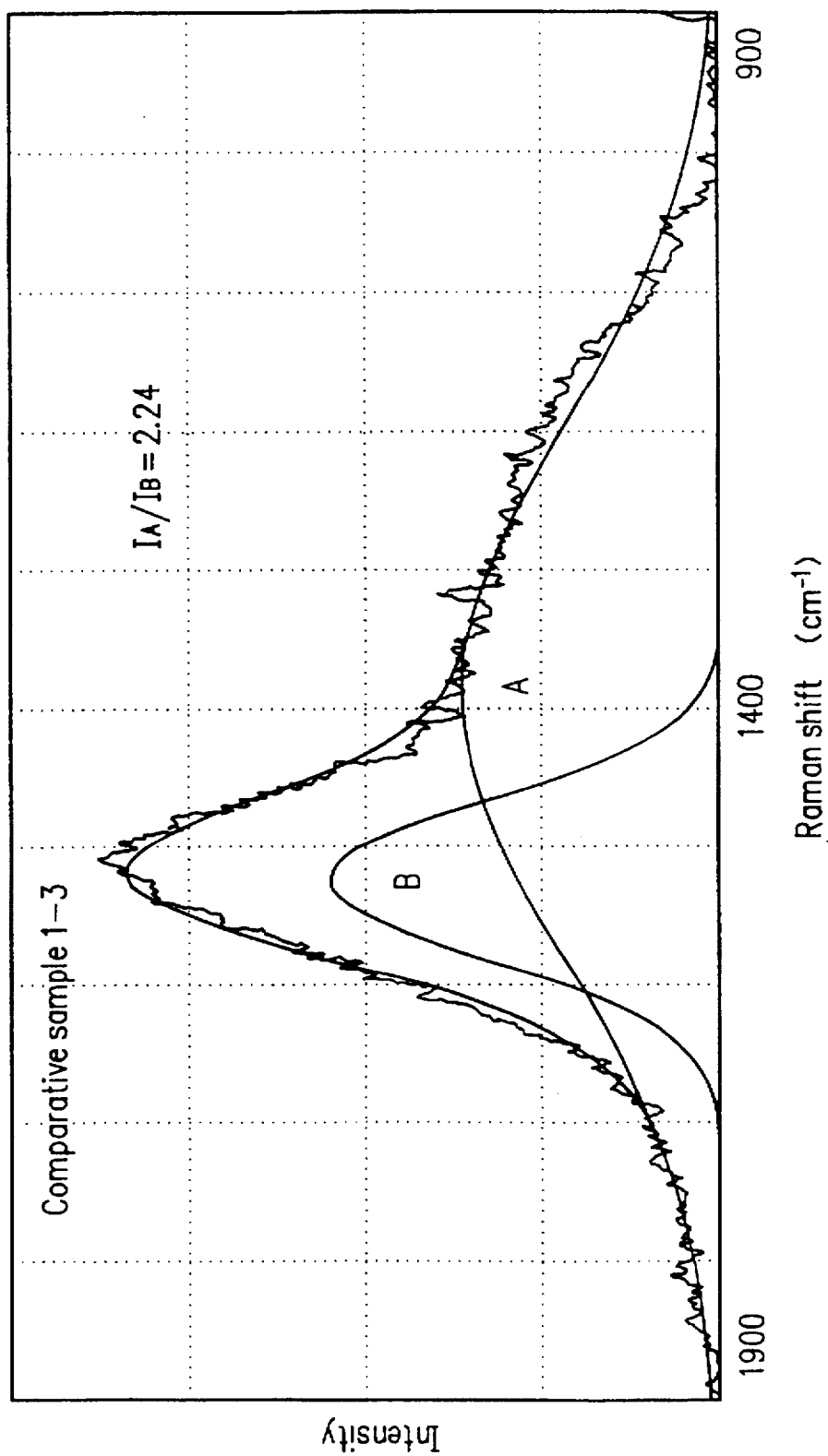
FIG. 10 is a Raman spectrum including Raman peaks A and B of Comparative Sample 1-3.

FIG. 6 is a schematic view of a layer-forming apparatus for forming the carbon layer 5c containing nitrogen atoms constituting the ferromagnetic thin metal layer type magnetic tape according to the third aspect of the present invention, using a plasma CVD method. In FIG. 6, the vacuum chamber 7 is evacuated by using the vacuum pump 8 so that the vacuum chamber 7 is in a high vacuum state at the pressure in the range of $10^{-4}$ Torr to $10^{-5}$ Torr. The original tape 9 for a thin metal layer type magnetic tape, which consists of the ferromagnetic thin metal layer 3 and the back coating layer 4 formed on the surfaces of the non-magnetic substrate 1, is sent from the unwinding roll 10, passes through the external peripheries of the pass roll 11, the cylindrical cooling can 13 and the pass roll 12, and is wound by the winding roll 14. The cooling can 13 serves to control the rotation so that the original tape 9 for a thin metal layer type magnetic tape can be conveyed at constant speed.

A discharge tube 23 is nonequilibrium plasma generated space for forming the carbon layer 5c containing nitrogen atoms on the surface of the ferromagnetic thin metal layer 3 of the original tape 9 for a thin metal layer type magnetic tape. Inside the discharge tube 23, a partition plate 24 and pipe-shaped discharge electrodes 25 and 26 are provided. The distance between the tip portion of the discharge tube 23 and the original tape 9 for a thin metal layer type magnetic tape is set at 0.5 mm, and the distance between the tip portion of the partition plate 24 and the original tape 9 for a thin metal layer type magnetic tape is set at 5 mm. The pipeshaped discharge electrodes 25 and 26 are connected to power sources 27 and 28 for generating plasma, respectively. The power sources 27 and 28 for generating plasma can apply any one of three types of discharge methods, i.e., a method for applying a DC voltage alone, a method for applying an AC voltage alone, and a method for applying a DC voltage and an AC voltage in a superimposed manner. A material gas inlet 29 is for introducing a mixed gas (material gas) of a hydrocarbon gas and an inorganic gas such as argon into the discharge tube 23. A material gas inlet 30 is for introducing a mixed gas (material gas) of an organic gas containing nitrogen and an inorganic gas such as argon into the discharge tube 23.

Sample 3-1

On one surface of the polyethylene torephthalate film 1 (produced by Toray Industries, Inc.: E-26) having a thickness of 10 μm which surface has the minute protrusion layer 2 having $10^5$ to $10^9$ minute protrusion per one $mm^2$ with the maximum height roughness Rmax of 15 nm and a diameter of about 200 nm measured by the surface structure analysis with a scanning tunneling microscope (STM), The ferromagnetic metal thin film 3 of Co-O having a thickness of 180 nm is formed by the continuously incident angle changing vapor deposition method. Further, on the other surface of the polyethylene terephthalate film 1, the back coating layer 4 having a thickness of 500 nm after drying is formed by coating a mixture of carbon black, calcium carbonate, a polyester resin and nitrocellulose resin in a mixed solvent of methyl ethyl ketone, toluene and cyclohexanon (solid content of 15% by weight) by the wet coating method.

Next, the original tape 9 for the thin metal layer type magnetic tape is placed within the vacuum chamber 7 of the layer-forming apparatus shown in FIG. 6. After the vacuum chamber 7 is evacuated, benzene gas (hydrocarbon gas: $C_6H_6$) and argon gas (inorganic gas: Ar) are introduced from the material gas inlet 29 into the discharge tube 23. Then, the flow rate of the gases is adjusted so that a pressure ratio of benzene gas and argon gas is 4:1 and the total pressure of gas is 0.20 Torr. Allylamine gas (organic gas containing nitrogen: $C_3H_7N$) and argon gas are introduced into the discharge tube 23 from the material gas inlet 30. Then, the flow rate of the gases is adjusted so that a pressure ratio of allylamine gas and argon gas is 4:1 and the total pressure of gas is 0.25 Torr. Thereafter, a DC voltage of 1300 V is applied to the pipe-shaped discharge electrode 25 and a DC voltage of 1100 V is applied to the pipe-shaped discharge electrode 26 while conveying the original tape 9 at a rate of 16 m/min to generate a nonequilibrium plasma to form the carbon layer 5c containing nitrogen atoms. The resultant carbon layer 5c containing nitrogen atoms, in which the concentration of nitrogen atoms gradually decreases in a depth direction away from the uppermost surface, is formed having a thickness of 12 nm on the surface of the ferromagnetic thin metal layer 3 of the original tape 9.

Then, on the surface of carbon layer 5c containing nitrogen atoms, a solution of $C_5F_{11}(CHN_2)_{10}COOH$ in isopropanol at a concentration of 2000 ppm is wet coated and dried to form a lubricant layer 6 having a thickness of 3 nm. Then, the original tape 9 is slit to a width of 8 mm to obtain an 8 mm thin metal layer type magnetic tape for VCR.

Sample 3-2

An 8 mm thin metal layer type magnetic tape for VCR is produced by the same method as that of Sample 3-1 except that the carbon layer 5c containing nitrogen atoms is formed to a thickness of 12 nm under the following conditions: toluene (hydrocarbon gas: $C_7H_8$) is used as a material gas for forming the carbon layer 5c containing nitrogen atoms instead of benzene; a pressure ratio of toluene gas and argon gas is 4:1; the total pressure of gas is 0.25 Torr; an applied discharge voltage is a DC voltage of 1500 V; butylamine (organic gas containing nitrogen: $C_4H_{11}N$) is used instead of allylamine; a length of part partitioned by the partition plate 24, in which the material gas inlet 30 is provided, of the discharge tube 23 in a longitudinal direction of the original tape (a direction in which the original tape is conveyed) is set to one-third of the standard length; a pressure ratio of butylamine gas and argon gas is 5:1; the total pressure of gas is 0.30 Torr; and an applied discharge voltage is a DC voltage of 650 V.

Sample 3-3

An 8 mm thin metal layer type magnetic tape for VCR is produced by the same method as that of Sample 3-1 except that the carbon layer 5c containing nitrogen atoms are formed to a thickness of 18 nm under the following conditions: methane (hydrocarbon gas: $CH_4$) is used as a material gas for forming the carbon layer 5c containing nitrogen atoms instead of benzene; a length of part partitioned by the partition plate 24, in which the material gas inlet 29 is provided, of the discharge tube 23 in a longitudinal direction of the original tape (a direction in which the original tape is conveyed) is set to three-fifths of the standard length; a pressure ratio of methane gas and argon gas is 3:1; the total pressure of gas is 0.08 Torr; an applied discharge voltage is a DC voltage of 800 V; butylamine is used instead of allylamine; a pressure ratio of butylamine gas and argon gas is 5:1; the total pressure of gas is 0.30 Torr; an applied discharge voltage is a DC voltage of 650 V; and the original tape is conveyed at 3 m/min.

Sample 3-4

An 8 mm thin metal layer type magnetic tape for VCR is produced by the same method as that of Sample 3-1 except that the carbon layer 5c containing nitrogen atoms is formed to a thickness of 12 nm under the following conditions: a length of part partitioned by the partition plate 24, in which the material gas inlet 29 is provided, of the discharge tube 23 in a longitudinal direction of the original tape (a direction in which the original tape is conveyed) is set to be half of the standard length; a pressure ratio of benzene gas and argon gas is 4:1; the total pressure of gas is 0.20 Torr; pyridine is used instead of allylamine; a pressure ratio of pyridine gas and argon gas is 3:1; the total pressure of gas is 0.20 Torr; an applied discharge voltage is a DC voltage of 1400 V; and the original tape is conveyed at 12 m/min.

Comparative Sample 3-1

An 8 mm thin metal layer type magnetic tape for VCR is produced by the same method as that of Sample 3-1 except that a carbon layer is formed to a thickness of 12 nm under the following conditions: methane is used as a material gas for forming the carbon layer instead of allylamine; and an applied discharge voltage is a DC voltage 500 V.

Comparative Sample 3-2

An 8 mm thin metal layer type magnetic tape for VCR is produced by the same method as that of Sample 3-1 except that the carbon layer 5c containing nitrogen atoms is formed to a thickness of 12 nm under the following conditions: a length of part partitioned by the partition plate 24, in which the material gas inlet 29 is provided, of the discharge tube 23 in a longitudinal direction of the original tape (a direction in which the original tape is conveyed) is set to two-thirds of the standard length; a pressure ratio of benzene gas and argon gas is 4:1; the total pressure of gas is 0.20 Torr; a length of part partitioned by the partition plate 24, in which the material gas inlet 30 is provided, of the discharge tube 23 in a longitudinal direction of the original tape (a direction in which the original tape is conveyed) is set to be double of the standard length; a pressure ratio of allylamine gas and argon gas is 4:1; the total pressure of gas is 0.25 Torr; and an applied discharge voltage is a DC voltage of 1900 V.

Comparative Sample 3-3

An 8 mm thin metal layer type magnetic tape for VCR is produced by the same method as that of Sample 3-1 except that the carbon layer 5c containing nitrogen atoms is formed to a thickness of 18 nm under the following conditions: a length of part partitioned by the partition plate 24, in which the material gas inlet 29 is provided, of the discharge tube 23 in a longitudinal direction of the original tape (a direction in which the original tape is conveyed) is set to two-fifths of the standard length; a pressure ratio of methane gas and argon gas is 3:1; the total pressure of gas is 0.08 Torr; an applied discharge voltage is a DC voltage of 800 V; propylamine (organic gas containing nitrogen: $C_3H_9N$) is used instead of allylamine; a pressure ratio of propylemine gas and argon gas is 9:1; the total pressure of gas is 0.30 Torr; an applied discharge voltage is a DC voltage of 450 V; and the original tape is conveyed at 3 m/min.

Comparative Sample 3-4

An 8 mm thin metal layer type magnetic tape for VCR is produced by the same method as that of Sample 3-1 except that the carbon layer 5c containing nitrogen atoms is formed to a thickness of 18 nm under the following conditions: methane is used as a material gas for forming the carbon layer 5c containing nitrogen atoms instead of benzene; a length of part partitioned by the partition plate 24, in which the material gas inlet 29 is provided, of the discharge tube 23 in a longitudinal direction of the original tape (a direction in which the original tape is conveyed) is set to 2.5 times of the standard length; a pressure ratio of methane gas and argon gas is 4:1; the total pressure of gas is 0.25 Torr; an applied discharge voltage is a DC voltage of 500 V; butylamine alone is used instead of allylamine and argon; the pressure of gas is 0.30 Torr; an applied discharge voltage is an AC voltage of 700 V (frequency of 30 kHz); and the original tape is conveyed at 8 m/min.

A ratio of integrated intensities of two Raman peaks regarding the vicinity of the surface (a region from the uppermost surface to a depth of less than 1 nm) and the region other than the vicinity of the surface of the carbon layer 5c containing nitrogen atoms in Samples and Comparative Samples (the carbon layer in the case of Comparative Sample 3-1) corresponds to a value obtained by the following procedure. Two Raman peaks (A) and (B), which are obtained by Raman spectral analysis (RS) utilizing an argon ion laser (wavelength: 514.5 nm) as excitation light, are subjected to a waveform separation processing with two Gaussian curves. The integrated intensity of Raman peak (A) after waveform separation is divided by the integrated intensity of Raman peak (B) after waveform separation, thereby obtaining a value corresponding to the ratio of integrated intensities of two Raman peaks. The results are shown in Table 5.

Each chemical composition (atomic ratio) in the vicinity of the surface (the region from the uppermost surface to a depth of less than 1 nm) of the carbon layer 5c containing nitrogen atoms (the carbon layer in the case of Comparative Sample 3-1) in Samples and Comparative Samples is obtained by surface analysis with angle resolved XPS using the original tape 9 for a thin metal layer type magnetic tape in which the lubricant layer 6 containing fluorine is not formed yet. The results are shown in Table 5.

The density of the carbon layer 5c containing nitrogen atoms (carbon layer in the case of Comparative Sample 3-1) in Samples and Comparative Samples is calculated from the amount of shift of the peak position of Co atoms constituting the ferromagnetic thin metal layer 3 to a lower energy side before and after the formation of the carbon layer 5c containing nitrogen atoms (the carbon layer in the case of Comparative Sample 3-1) in a RBS spectrum obtained by RBS analysis using a helium ion as a probe ion. The results are shown in Table 5.

Furthermore, carbon layers containing nitrogen atoms (a carbon layer in the case of Comparative Sample 3-1) to a thickness in the range of about 1 to about 3 μm are respectively formed on silicon wafers instead of the original tapes 9 for a thin metal layer type magnetic tape under the same conditions as those in Samples and Comparative Samples, thereby producing several kinds of samples. The Vickers hardness of each of the sample is measured using a micro hardness meter. The Vickers hardness of the carbon layer 5c containing nitrogen atoms (the carbon layer in the case of Comparative Sample 3-1) corresponding to a thickness of 12 nm (18 nm in the case of Sample 3-3, Comparative Samples 3-3 and 3-4) is calculated by extrapolation based on its thickness dependence. The resultant value is used as a Vickers hardness value of the carbon layer 5c containing nitrogen atoms (the carbon layer in the case of Comparative Sample 3-1). A thickness of the carbon layer 5c containing nitrogen atoms (the carbon layer in the case of Comparative Sample 3-1) in each of the above sample is a value measured by an ellipsometer. The results are shown in Table 5.

appropriate amount of nitrogen atoms having strong chemical affinity with a polar group (carboxyl group) introduced into the lubricant molecules. Furthermore, the carbon layer has such a configuration that the amount of $SP^2$ components is relatively large while the carbon atoms are mainly bonded to each other in an $SP^3$ form. In the Samples 3-1 to 3-4, the atomic ratio of nitrogen to carbon in the uppermost surface of the carbon layer is in the range of about 5 to about 20%, the atomic ratio of nitrogen to oxygen in the uppermost surface of the carbon layer is about 70% or more, and the atomic ratio of oxygen to carbon is in the range of about 7 to about 20%. Therefore, it is possible to firmly hold the lubricant molecules onto the surface of tape. Furthermore, since the region of the carbon layer other than the vicinity of the interface with the lubricant layer has a highly hard and dense structure including a large number of $SP^3$ bonds, it

TABLE 5

| | Characteristics of carbon layer | | | | | | |
|---|---|---|---|---|---|---|---|
| | $I_A/I_B$* | $A_N/A_C$** [%] | $A_N/A_O$*** [%] | $I_A/I_B$* | Density [g/cm³] | Vickers hardness [kg/mm²] | Thickness [nm] |
| Sample 3-1 | 1.34 | 5.1 | 76.9 | 1.09 | 2.20 | 2300 | 12 |
| Sample 3-2 | 1.94 | 19.4 | 93.0 | 0.99 | 2.28 | 2400 | 12 |
| Sample 3-3 | 1.96 | 19.5 | 93.1 | 1.22 | 1.69 | 1850 | 18 |
| Sample 3-4 | 1.24 | 5.3 | 72.1 | 1.08 | 2.18 | 2200 | 12 |
| Comparative sample 3-1 | 1.49 | — | — | 1.11 | 2.17 | 2200 | 12 |
| Comparative sample 3-2 | 1.15 | 4.1 | 66.7 | 1.06 | 2.24 | 2400 | 12 |
| Comparative sample 3-3 | 2.23 | 23.1 | 97.3 | 1.24 | 1.50 | 1750 | 18 |
| Comparative sample 3-4 | 3.37 | 32.6 | 97.9 | 1.60 | 1.85 | 1950 | 18 |

*$I_A$:Integrated intensity for peak A
$I_B$:Integrated intensity for peak B
**$A_N/A_C$:Atomic ratio of N atom to C atom
***$A_N/A_O$:Atomic ratio of N atom to O atom Each of the 8 mm thin metal layer type magnetic tapes for VCR (hereinafter, referred simply as magnetic tapes) obtained in the above Samples and Comparative Samples is subjected to the same measurements as those in Example 1.

Table 6 shows the results of evaluation of each of the 8 mm thin metal layer type magnetic tapes for VCR produced in Samples and Comparative Samples.

becomes possible to ensure the abrasive resistance of the carbon layer itself while appropriately alleviating the internal stress of the carbon layer itself. Thus, it becomes possible to remarkably improve the durability, the weather resistance and the running stability owing to sufficient synergistic effect of the carbon layer and the lubricant layer which are formed on the magnetic layer.

TABLE 6

| | Characteristics of magnetic tape | | | | |
|---|---|---|---|---|---|
| | Still life [min] | HTA test† | Still-frame life after HTA test† [min] | Coefficient of friction μk after HTA test† | Running durability test [pass number] |
| Sample 3-1 | >600 | 5 | >300 | 0.18 | 300 |
| Sample 3-2 | 560 | 5 | 250 | 0.18 | 300 |
| Sample 3-3 | 340 | 5 | 140 | 0.24 | 300 |
| Sample 3-4 | 430 | 5 | 230 | 0.20 | 270 |
| Comparative sample 3-1 | 50 | 3 | 20 | 0.27 | 110 |
| Comparative sample 3-2 | 230 | 4 | 85 | 0.24 | 160 |
| Comparative sample 3-3 | 120 | 4 | 45 | 0.26 | 230 |
| Comparative sample 3-4 | 90 | 3 | 30 | 0.29 | 150 |

†HTA test:Humidity-temperature acceleration test

As is apparent from Tables 5 and 6, the thin metal layer type magnetic tape of Example 3 includes the carbon layer formed on a ferromagnetic thin metal layer, the vicinity of the uppermost surface (the region from the uppermost surface to a depth of less than 1 nm) of which contains an In Comparative Sample 3-1, the vicinity of the uppermost surface of the carbon layer does not contain nitrogen atoms. Furthermore, in Comparative Sample 3-2, an atomic ratio of nitrogen to carbon ($A_N/A_C$) and an atomic ratio of nitrogen to oxygen ($A_N/A_O$) in the vicinity of the uppermost surface of the carbon layer are respectively below the appropriate ranges of the present invention. In addition, the carbon layer has such a configuration that a relatively small amount of $SP^2$ components is contained therein. Thus, the adherence between the carbon layer and the lubricant layer containing fluorine is not improved, resulting in deterioration of durability, weather resistance and the like.

Although the carbon layer and the lubricant layer are firmly adhered to each other owing to chemical affinity of nitrogen atoms in the vicinity of the uppermost layer of the carbon layer and the polar group (carboxyl group) introduced into the lubricant molecules in Comparative Sample 3-3, the thickness of the surface region of the carbon layer, in which an atomic ratio of nitrogen to carbon is above an appropriate range of the present invention, is too large. As a result, the abrasion resistance of the carbon layer itself is lowered, resulting in deterioration of durability and weather resistance.

Although the carbon layer and the lubricant layer are firmly adhered to each other owing to chemical affinity between nitrogen atoms in the carbon layer and the polar group (carboxyl group) introduced into the lubricant molecules in Comparative Sample 3-4, the number of $SP^3$ bonds in the region other than the vicinity of the interface of the carbon layer with the lubricant layer is so small that the abrasion resistance of the carbon layer itself is lowered, resulting in deterioration of durability and weather resistance.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording medium comprising:

a non-magnetic substrate;

a ferromagnetic thin metal layer formed on the non-magnetic substrate;

a carbon layer; and a lubricant layer in contact with the carbon layer so that the carbon layer is positioned between the ferromagnetic thin metal layer and the lubricant layer, wherein the carbon layer contains nitrogen atoms, the Raman spectrum of the carbon layer has a peak A in the range of about 1310 to about 1410 cm$^{-1}$ and a peak B in the range of about 1520 to about 1570 cm$^{-1}$, the ratio of integrated intensities of the peak A to the peak B is in the range of about 1.2 to about 2.0, and the atomic percentage of nitrogen to carbon in the carbon layer is in the range of about 5 to about 20%.

2. A magnetic recording medium according to claim 1, wherein an atomic percentage of nitrogen with respect to oxygen in the carbon layer is about 70% or more.

3. A magnetic recording medium according to claim 1, wherein density of the carbon layer is about 1.5 g/cm$^3$ or more.

4. A magnetic recording medium according to claim 1, wherein Vickers hardness of the carbon layer is about 1800 kg/mm$^2$ or greater.

5. A magnetic recording medium according to claim 1, wherein the lubricant layer comprises a fluorine-containing compound having one or more polar group selected from the group consisting of: —COOH, —OH, —SH, —NH$_2$, >NH, —CONH$_2$, —COHNR, —CONR$_2$, —COOR, >PR, >PRO, >PRS, —OPO(OH)$_2$, —OPO(OR)$_2$, and —SO$_3$M where R is a hydrocarbon group having 1 to 22 carbons, and M is one of hydrogen, an alkali metal and an alkali earth metal.

6. A magnetic recording medium comprising:

a non-magnetic substrate;

a ferromagnetic thin metal layer formed on the non-magnetic substrate;

a carbon multilayered structure including a plurality of carbon layers; and a lubricant layer in contact with the uppermost carbon layer of the carbon multilayered structure so that the carbon multilayered structure is positioned between the ferromagnetic thin metal layer and the lubricant layer, wherein at least the uppermost carbon layer of the plurality of carbon layers contain nitrogen atoms and the concentration of nitrogen atoms in a carbon layer other than the uppermost carbon layer is lower than that in the uppermost carbon layer, the Raman spectrum of the uppermost carbon layer has a peak A in the range of about 1310 to about 1410 cm$^{-1}$ and a peak B in the range of about 1520 to about 1570 cm$^{-1}$, a ratio of integrated intensities of the peak A to the peak B is in the range of about 1.2 to about 2.0, and an atomic percentage of nitrogen to carbon in the uppermost carbon layer is in the range of about 5 to about 20%.

7. A magnetic recording medium according to claim 6, wherein a concentration of nitrogen atoms decreases from the uppermost carbon layer nearest to the lubricant layer to a carbon layer nearest to the ferromagnetic thin metal layer.

8. A magnetic recording medium according to claim 7, wherein an atomic percentage of nitrogen with respect to oxygen in the uppermost carbon layer is about 70% or more.

9. A magnetic recording medium according to claim 6, wherein a thickness of the uppermost carbon layer is in the range of 1 to 15 nm, and a ratio of the thickness of the uppermost carbon layer to a total thickness of the carbon multilayered structure other than the uppermost carbon layer is in the range of about 0.05 to about 5.

10. A magnetic recording medium according to claim 6, wherein a Raman spectrum of a carbon layer other than the uppermost carbon layer has a peak A in the range of about 1310 to about 1410 cm$^{-1}$ and a peak B in the range of about 1520 to about 1570 cm$^{-1}$, and a ratio of integrated intensities of the peak A to the peak B is about 1.2 or lower.

11. A magnetic recording medium according to claim 7, wherein a Raman spectrum of the carbon multilayered structure layers other than the uppermost layer has a peak A in the range of about 1310 to about 1410 cm$^{-1}$ and a peak B in the range of about 1520 to about 1570 cm$^{-1}$, and a ratio of integrated intensity of the peak A to the peak B is about 1.2 or lower.

12. A magnetic recording medium according to claim 6, wherein the density of the carbon multilayered structure is about 1.5 g/cm$^3$ or greater.

13. A magnetic recording medium according to claim 6, wherein Vickers hardness of the carbon multilayered structure is about 1800 kg/mm$^2$ or greater.

14. A magnetic recording medium according to claim 6, wherein the lubricant layer comprises a fluorine-containing compound having one or more polar groups selected from the groups consisting of: —COOH, —OH, —SH, —NH$_2$, >NH, —CONH$_2$, —CONHR, —CONR$_2$, —COOR, >PR, >PRO, >PRS, —OPO(OH)$_2$, —OPO(OR)$_2$, and —SO$_3$M where R is hydrocarbon having 1 to 22 carbons, and M is one of hydrogen, an alkali metal and an alkali earth metal.

15. A magnetic recording medium comprising:

a non-magnetic substrate;

a ferromagnetic thin metal layer formed on the non-magnetic substrate;

a carbon layer; and a lubricant layer in contact with the carbon layer so that the carbon layer is positioned between the ferromagnetic thin metal layer and the lubricant layer the carbon layer comprises an interfacial region adjacent the lubricant layer, wherein the carbon layer contains nitrogen atoms and the concentration of nitrogen atoms of the carbon layer decreases in a continuous manner from the side in the interfacial region of the carbon layer adjacent the lubricant layer to the side of the carbon layer facing to the ferromagnetic thin metal layer, the Raman spectrum of the interfacial region of the carbon layer has a peak A in the range of about 1310 to about 1410 cm$^{-1}$ and a peak B in the range of about 1520 to about 1570 cm$^{-1}$, the ratio of integrated intensities of the peak A to the peak B is in the range of about 1.2 to about 2.0, and the atomic percentage of nitrogen to carbon in the interfacial region of the carbon layer is in the range of about 5 to about 20%.

16. A magnetic recording medium according to claim 15, wherein the atomic percentage of nitrogen with respect to oxygen in the interfacial regio of the carbon layer is about 70 % or more.

17. A magnetic recording medium according to claim 15, wherein a Raman spectrum of a region other than the interfacial region of the carbon layer has a peak A in the range of about 1310 to about 1410 cm$^{-1}$ and a peak B in the range of about 1520 to about 1570 cm$^{-1}$, and a ratio of integrated intensity of the peak A to the peak B is about 1.2 or lower.

18. A magnetic recording medium according to claim 15, wherein density of the carbon layer is about 1.5 g/cm$^3$ or greater.

19. A magnetic recording medium according to claim 15, wherein Vickers hardness of the carbon layer is about 1800 kg/mm$^2$ or greater.

20. A magnetic recording medium according to claim 15, wherein the lubricant layer comprises a fluorine-containing compound having one or more polar groups selected from the groups consisting of: —COOH, —OH, —SH, —NH$_2$, >NH, —CONH$_2$, —CONHR, —CONR$_2$, —COOR, >PR, >PRO, >PRS, —OPO(OH)$_{21}$ —OPO(OR)$_2$, and —SO$_3$M where R is hydrocarbon having 1 to 22 carbons, and M is one of hydrogen, an alkali metal and an alkali earth metal).

* * * * *